US012605828B2

(12) United States Patent
Ikeda

(10) Patent No.: US 12,605,828 B2
(45) Date of Patent: Apr. 21, 2026

(54) SYSTEM, METHOD, AND PROGRAM FOR GENERATING THREE-DIMENSION MODEL

(71) Applicant: TOYOTA JIDOSHA KABUSHIKI KAISHA, Toyota (JP)

(72) Inventor: Takuya Ikeda, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 412 days.

(21) Appl. No.: 18/183,238

(22) Filed: Mar. 14, 2023

(65) Prior Publication Data

US 2023/0311307 A1 Oct. 5, 2023

(30) Foreign Application Priority Data

Apr. 4, 2022 (JP) ................................. 2022-062507

(51) Int. Cl.
| | |
|---|---|
| *B25J 9/16* | (2006.01) |
| *B25J 13/08* | (2006.01) |
| *G01B 11/24* | (2006.01) |
| *G06T 7/50* | (2017.01) |

(Continued)

(52) U.S. Cl.
CPC ........... *B25J 9/1612* (2013.01); *B25J 13/081* (2013.01); *G01B 11/24* (2013.01); *G06T 7/50* (2017.01); *G06T 7/68* (2017.01); *G06T 17/00* (2013.01); *G06T 2207/10028* (2013.01)

(58) Field of Classification Search
CPC ......... B25J 9/1612; B25J 13/081; G06T 7/68; G06T 7/50; G06T 17/00; G06T 2207/10028; G01B 11/24
See application file for complete search history.

(56) References Cited

U.S. PATENT DOCUMENTS

| | | | | |
|---|---|---|---|---|
| 6,278,460 B1 * | 8/2001 | Myers | ..................... | G06T 15/06 |
| | | | | 382/154 |
| 10,166,676 B1 * | 1/2019 | Hudson | .................. | B25J 9/1612 |
| 11,246,333 B2 * | 2/2022 | Mitchell | ................... | G06T 7/90 |

(Continued)

FOREIGN PATENT DOCUMENTS

| | | |
|---|---|---|
| JP | 2012-150796 A | 8/2012 |
| JP | 2016-109630 A | 6/2016 |
| JP | 2021-085781 A | 6/2021 |

OTHER PUBLICATIONS

Andreas Pas, et al., "Grasp Pose Detection in Point Clouds", SAGE, https://arxiv.org/abs/1706.09911v1 [cs.RO]; Jun. 29, 2017, pp. 1-17, vol. 01.

*Primary Examiner* — Wade Miles
*Assistant Examiner* — James Brian Chin
(74) *Attorney, Agent, or Firm* — Sughrue Mion, PLLC

(57) ABSTRACT

A system, a method, and a program for generating a three-dimensional model are provided. A system for generating a three-dimensional model according to an embodiment includes an end effector including a flexible grip part for gripping an object, a deformation sensor configured to detect a deformed shape of the grip part in a state of gripping the object, a calculation unit configured to calculate a normal direction of a surface of the object from surface shape data of the object, a decision unit configured to decide a grip position of the object to be gripped by the end effector based on the normal direction, and a coordinate system setting unit configured to set a reference coordinate system according to the deformed shape of the grip part.

15 Claims, 14 Drawing Sheets

(51) Int. Cl.
    *G06T 7/68*         (2017.01)
    *G06T 17/00*      (2006.01)

(56)          References Cited

U.S. PATENT DOCUMENTS

| | | | |
|---|---|---|---|
| 11,584,026 B2 * | 2/2023 | Alspach | B25J 15/0033 |
| 2003/0007159 A1 * | 1/2003 | Franke | G01B 11/25 |
| | | | 356/604 |
| 2013/0238129 A1 * | 9/2013 | Rose | B25J 19/0029 |
| | | | 700/258 |
| 2013/0271577 A1 * | 10/2013 | Watanabe | G06T 7/75 |
| | | | 348/46 |
| 2014/0104395 A1 * | 4/2014 | Rohaly | G01B 11/245 |
| | | | 348/47 |
| 2015/0054918 A1 * | 2/2015 | Lee | H04N 13/254 |
| | | | 348/46 |
| 2016/0171746 A1 * | 6/2016 | Lilien | G01B 11/24 |
| | | | 348/46 |
| 2017/0038757 A1 * | 2/2017 | Novakovic | G05B 19/27 |
| 2017/0326739 A1 * | 11/2017 | Nakazato | B25J 13/081 |
| 2018/0186004 A1 * | 7/2018 | Park | G06T 7/80 |
| 2019/0091871 A1 * | 3/2019 | Alspach | G01B 11/16 |
| 2019/0248003 A1 * | 8/2019 | Nagarajan | B25J 9/163 |
| 2020/0246980 A1 * | 8/2020 | Kuppuswamy | B25J 15/0033 |
| 2022/0126453 A1 * | 4/2022 | Corcodel | B25J 9/1694 |
| 2023/0266120 A1 * | 8/2023 | Rohaly | G01B 13/16 |
| | | | 356/600 |
| 2025/0033196 A1 * | 1/2025 | Rohaly | B25J 15/0019 |

* cited by examiner

AXIS

300

0

500

220

210

200

ROTATION AXIS

400

100

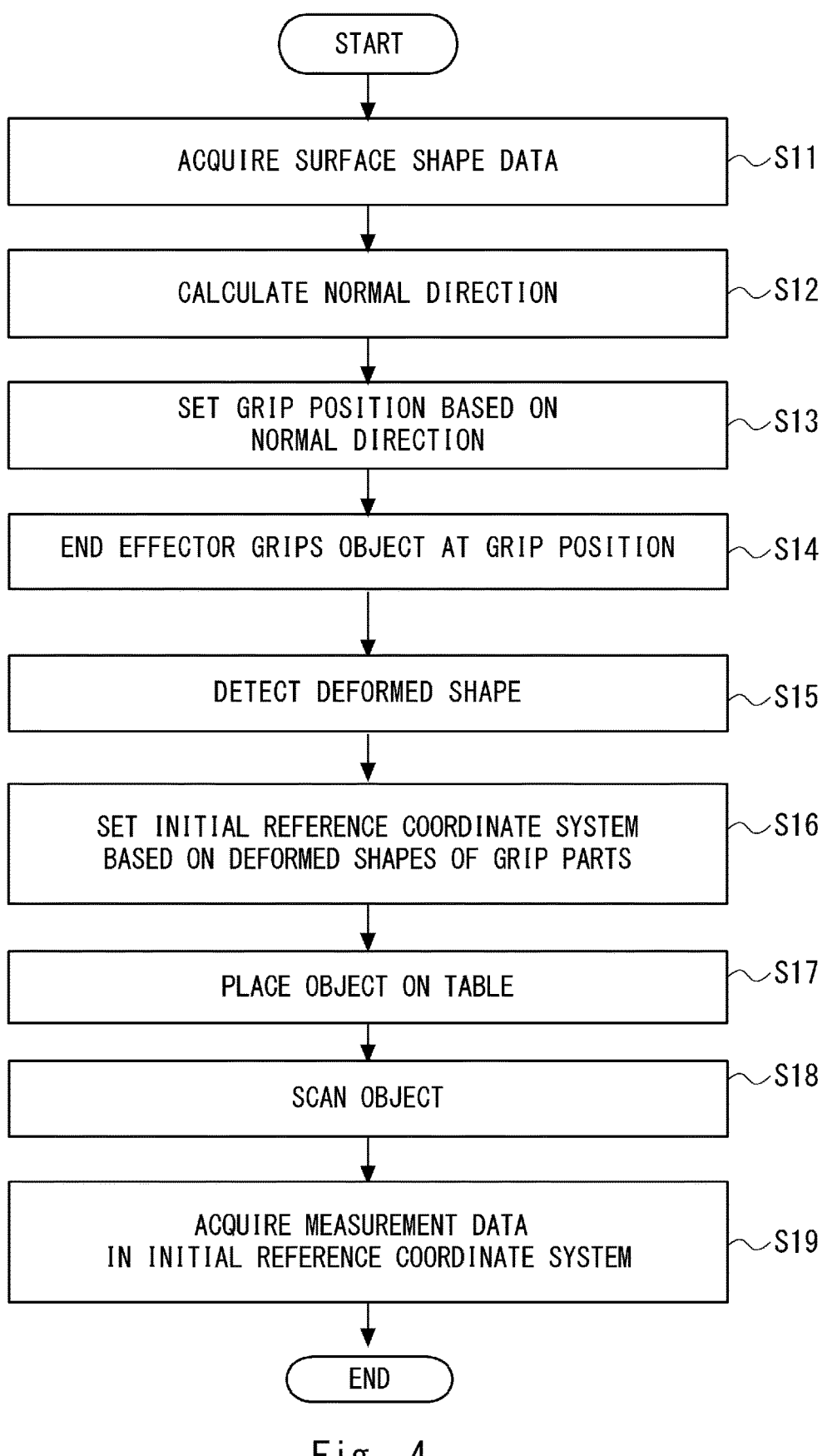
F i g. 4

NOT ROTATIONALLY SYMMETRIC          ROTATIONALLY SYMMETRIC

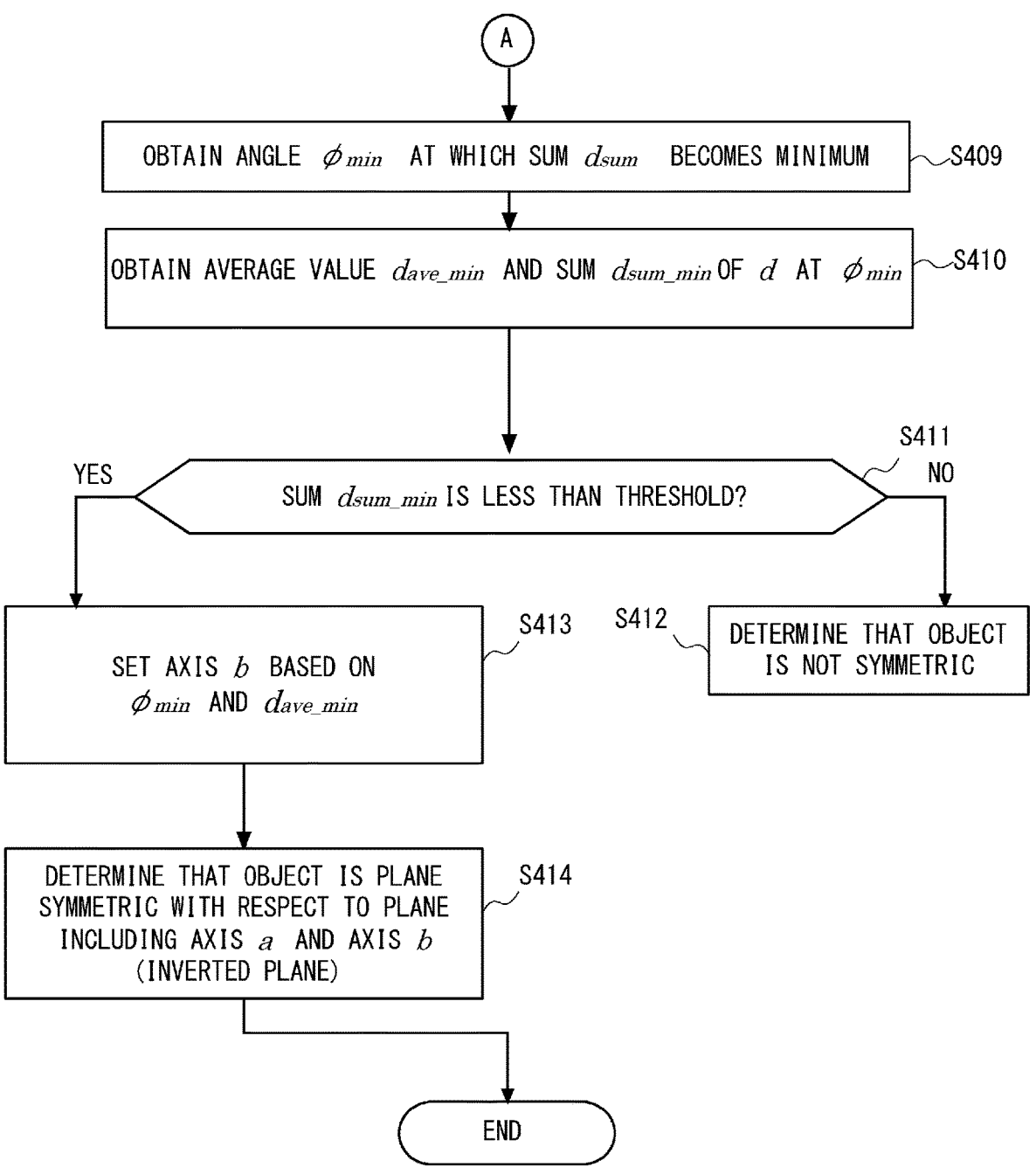
F i g. 11

SYSTEM, METHOD, AND PROGRAM FOR GENERATING THREE-DIMENSION MODEL

CROSS REFERENCE TO RELATED APPLICATIONS

This application is based upon and claims the benefit of priority from Japanese patent application No. 2022-062507, filed on Apr. 4, 2022, the disclosure of which is incorporated herein in its entirety by reference.

BACKGROUND

The present disclosure relates to a system, a method, and a program for generating a three-dimensional model.

Japanese Unexamined Patent Application Publication No. 2021-85781 discloses an information processing apparatus for calculating a position and a posture of an object. The information processing apparatus of Japanese Unexamined Patent Application Publication No. 2021-85781 acquires a three-dimensional shape model (edge information, point cloud information) from distance point cloud information of an object and determines rotational symmetry about a first axis. The information processing apparatus then determines inversion symmetry about a second axis, which is different from the first axis.

SUMMARY

In Japanese Unexamined Patent Application Publication No. 2021-85781, the rotational symmetry about the first axis and inversion symmetry about the second axis are determined. Therefore, it is difficult to set a coordinate axis automatically, and thus it is necessary for a human to set the coordinate axis. For this reason, it is difficult to generate three-dimensional models of various objects efficiently. It is possible to create three-dimensional models in a reference coordinate system that takes into consideration the symmetry of objects.

In generating three-dimensional shape models, it is possible to annotate appropriate information, for example, by setting a coordinate axis that takes into consideration the symmetry of objects. Therefore, it is possible to generate learning data added with position and posture information about the position and the posture of objects. An estimator of an object can be generated by supervised learning in which the position and posture information about the object is the correct label (teacher data).

The present disclosure has been made to solve such problems and provides a system, a method, and a program for generating a three-dimensional model that can efficiently generate a three-dimensional model in an appropriate coordinate system.

A system according to an embodiment for generating a three-dimensional model includes: an end effector including a flexible grip part for gripping an object; a deformation sensor configured to detect a deformed shape of the grip part in a state of gripping the object; a calculation unit configured to calculate a normal direction of a surface of the object from surface shape data of the object; a decision unit configured to decide a grip position of the object to be gripped by the end effector based on the normal direction; and a coordinate system setting unit configured to set a reference coordinate system according to the deformed shape of the grip part.

The above system for generating a three-dimensional model may further include: a three-dimensional shape measuring instrument configured to measure a three-dimensional shape of the object by scanning the object; and a drive control unit configured to drive the end effector so that the end effector places the object within a scan range of the three-dimensional shape measuring instrument.

In the above system for generating a three-dimensional model, the three-dimensional shape measuring instrument may include a depth sensor configured to measure a distance to the object, and a posture of the object with respect to the depth sensor may be changed about an axis of the reference coordinate system.

In the above system for generating a three-dimensional model, the three-dimensional shape measuring instrument may further include a table for rotating the placed object, and the end effector places the object so that an axis of rotation of the table matches the axis of the reference coordinate system.

The above system for generating a three-dimensional model may further include a surface shape sensor configured to measure surface shape data of the object before the end effector grips the object, and in the surface shape data, a portion of a cross section closest to a circle may be selected as the grip position of the end effector.

In the above system for generating a three-dimensional model, symmetry of the object may be determined for each axis of the reference coordinate system, and the axis of the reference coordinate system may be corrected according to a result of the determination of the symmetry.

A method according to the embodiment for generating a three-dimensional model includes: calculating a normal direction of a surface of an object according to surface shape data of the object; setting a grip position of the object based on the normal direction; gripping, by an end effector including a flexible grip part, the object at the grip position; detecting a deformed shape of the grip part when the object is gripped; and setting a reference coordinate system according to the deformed shape of the grip part.

The above method for generating a three-dimensional model may further include driving the end effector so that the end effector places the object within a scan range of the three-dimensional shape measuring instrument, and a three-dimensional shape of the object may be measured by the three-dimensional shape measuring instrument scanning the object.

In the above method for generating a three-dimensional model, the three-dimensional shape measuring instrument may include a depth sensor configured to measure a distance to the object, and a posture of the object with respect to the depth sensor may be changed about an axis of the reference coordinate system.

In the above method for generating a three-dimensional model, the three-dimensional shape measuring instrument may further include a table for rotating the placed object, and the end effector may place the object so that an axis of rotation of the table matches the axis of the reference coordinate system.

The above method for generating a three-dimensional model may further include measuring, by a surface shape sensor, surface shape data of the object before the end effector grips the object, and in the surface shape data, a portion of a cross section closest to a circle may be selected as the grip position of the end effector.

In the above method for generating a three-dimensional model, symmetry of the object may be determined for each axis of the reference coordinate system, and the axis may be corrected according to a result of the determination of the symmetry.

A program according to the embodiment causes at least one computer to execute: calculating a normal direction of a surface of an object according to surface shape data of the object; setting a grip position of the object based on the normal direction; controlling an end effector so that the end effector including a flexible grip part grips the object at the grip position; acquiring deformed shape data obtained by detecting a deformed shape of the grip part when the object is gripped; and setting a reference coordinate system according to the deformed shape of the grip part.

According to the present disclosure, it is possible to provide a system, a method, and a program for generating a three-dimensional model that can efficiently generate a three-dimensional model in an appropriate coordinate system.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 4 is a flowchart showing a method for generating a three-dimensional model according to an embodiment;

FIG. 11 is a flowchart showing processing of determining plane symmetry;

DESCRIPTION OF EMBODIMENTS

Hereinafter, the present disclosure is described through an embodiment of the disclosure, but the present disclosure according to the claims is not limited to the following embodiment. Moreover, not all of the configurations described in the embodiment are essential as means to solve the problem.

In recent years, machine learning models have been used as estimators to estimate the positions and postures of objects. To generate such estimators by machine learning, a large amount of learning data needs to be collected. The learning data may include not only images captured by a camera but also composite images generated by simulations.

Renderers and simulators generate composite images from three-dimensional models (also referred to as three-dimensional shape models or 3D models) that show the three-dimensional shapes of objects. By using a simulator or the like, a large number of composite images with different positions and postures of an object can be easily generated. Furthermore, the simulator or the like can annotate labels such as positions and postures to the composite images.

Sensors such as stereo cameras and depth sensors are used to create the three-dimensional models. For example, a depth sensor measures point cloud data of an object. The point cloud data includes, for example, information about position coordinates of respective points in an XYZ three-dimensional orthogonal coordinate system. The three-dimensional model can also be formed by converting the point cloud data into edge data, mesh data, surface data, or the like.

Figure 1:
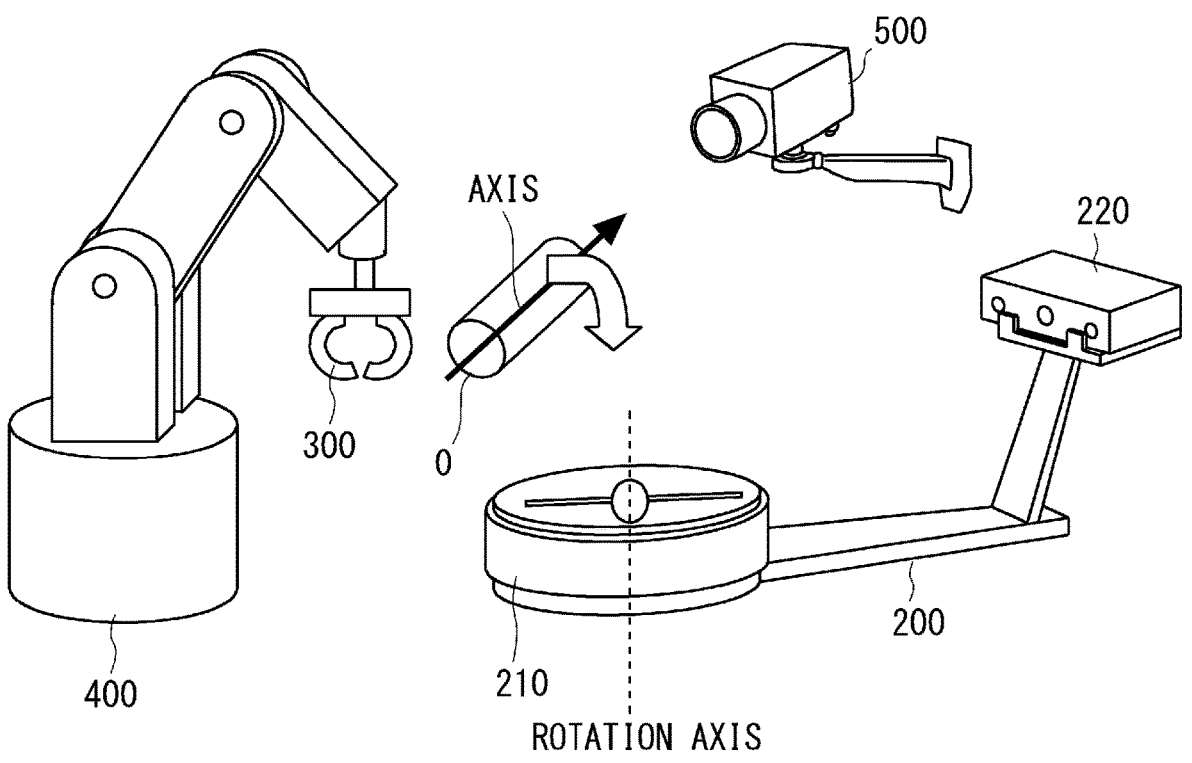
FIG. 1 is a schematic diagram showing a system configuration.
Figure 1:
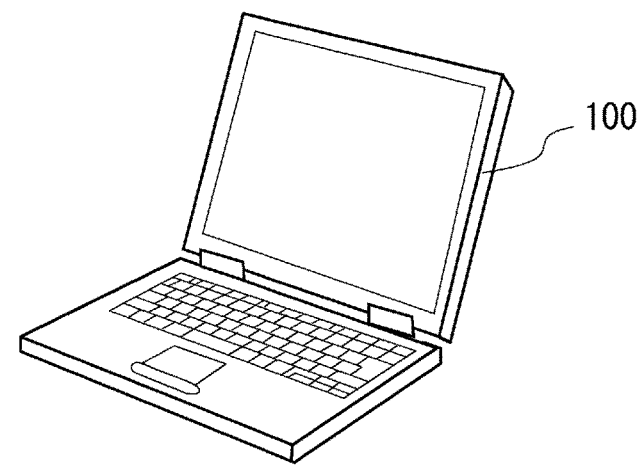

The system and method for generating a three-dimensional model according to this embodiment will be described with reference to the drawing. FIG. 1 is a block diagram showing the configuration of the system 1. The system 1 includes a processing apparatus 100, a three-dimensional shape measuring instrument 200, an end effector 300, an arm mechanism 400, and a ranging sensor 500. The system 1 generates a three-dimensional model showing the three-dimensional shape of the object O. The processing apparatus 100 may also perform processing to determine the symmetry of the object O.

The end effector 300 is a grip mechanism (robot hand) for gripping the object. The end effector 300 can release the object being gripped. The end effector 300 includes flexible grip parts. Specifically, parts of the end effector 300 that come into contact with the object O are formed of a flexible elastic body or the like. A configuration of the end effector 300 will be described later. The end effector 300 is attached to a leading end of the arm mechanism 400.

The arm mechanism 400 is a driving mechanism that drives the end effector 300. The arm mechanism 400 is a robotic arm with a plurality of joints. The arm mechanism 400 can change a position and a posture of the object O being gripped by the end effector 300. For example, the arm mechanism 400 changes the position and the posture of the object O by changing the position and the posture of the end effector 300. The arm mechanism 400 can move the end effector 300 to the grip position of the object O. When the end effector 300 grips the object O, the arm mechanism 400 can move the object O to the desired position. The positional relationship between the arm mechanism 400 and the three-dimensional shape measuring instrument 200 described later is known.

For example, the arm mechanism 400 and the end effector 300 can place the object O on the table 210. After the end effector 300 grips the object O, the arm mechanism 400 moves the end effector 300. This enables the object O to be moved onto the table 210. With the object O in contact with a mounting surface of the table 210, the end effector 300 releases the grip. This allows the arm mechanism 400 and the end effector 300 to move the object O onto the table 210.

The end effector 300 has flexible grip parts. When the end effector 300 grips the object O, the grip parts deform. The end effector 300 includes built-in sensors for measuring the deformed shapes of the grip parts. For example, the end effector 300 described in the following Non-Patent Literature 1 can be used. https://arxiv.org/abs/1706.09911

Figure 2:
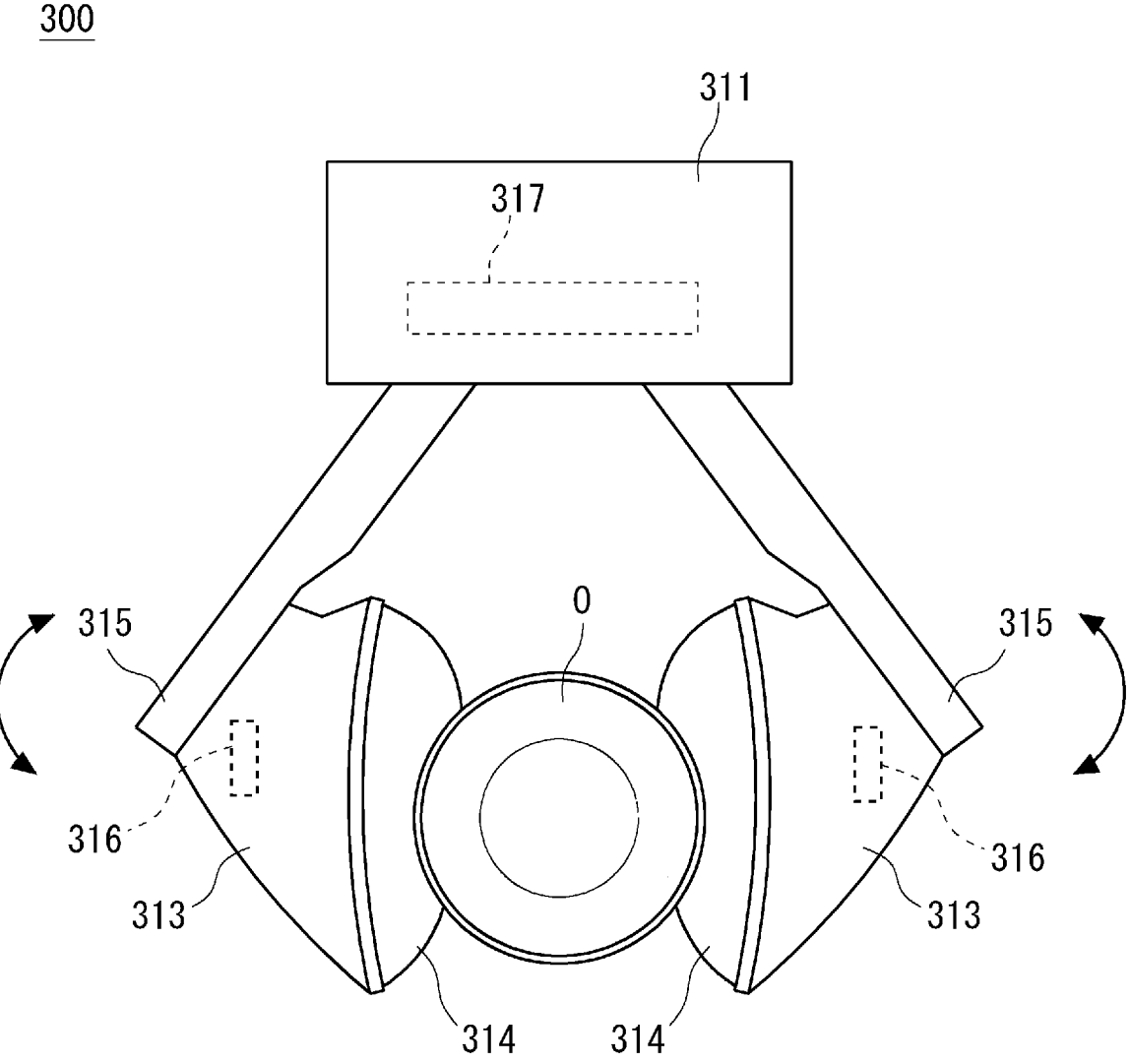
FIG. 2 is a top view schematically showing a configuration of an end effector.

FIG. 2 is a schematic diagram showing an example of the end effector 300. The end effector 300 includes a body part 311, a base part 313, grip parts 314, claw parts 315, deformation sensors 316, and an actuator 317.

The pair of claw parts 315 are rotatably provided to the body part 311. The claw part 315 is a gripper mechanism that is driven to grasp the object O. Here, the end effector 300 is a two-finger type mechanism with two claw parts 315. It is needless to say that the end effector 300 may be provided with three or more fingers. The end effector 300 is not limited to a gripper mechanism with fingers.

The grip parts 314 are respectively attached to the leading end parts of the two claw parts 315. Each of the grip parts 314 is fixed to the claw part 315 with the base part 313 interposed therebetween. The pair of grip parts 314 are arranged to sandwich the object O from both sides. The object O is arranged between the two grip parts 314. For example, in FIG. 2, one grip part 314 is arranged to the right of the object O and the other grip part 314 is arranged to the left of the object O. The grip part 314 is formed by a film or a sheet made of resin. Thus, the grip parts 314 deform along the shape of the object O at the grip position. That is, the grip parts 314 deform according to the shape of the object O at the points of contact with the object O.

The body part 311 is attached to the arm mechanism 400 shown in FIG. 1. The body part 311 is provided with the actuator 317 for driving the two claw parts 315. The actuator 317 drives the claw parts 315 in the direction of the arrows so that the leading end sides of the two claw parts 315 are brought closer to or away from each other. The actuator 317 grips the object O with the two claw parts 315 sandwiching it. When the end effector 300 performs the gripping action of gripping the object O, the actuator 317 drives the claw parts 315 so that the pair of claw parts 315 are brought close to each other. As a result, the grip parts 314 are brought into contact with the object O and the object O can be pinched. When a release action to release the gripping of the object O is performed, the actuator 317 drives the claw parts 315 so that the pair of claw parts 315 are separated. Then, the grip parts 314 are separated from the object O, and thus the object O can be released.

The deformation sensors 316 are attached to the base part 313. The deformation sensors 316 detect the deformed shape of the grip parts 314. Each of the deformation sensors 316 is included in between the grip part 314 and the base part 313. For example, the grip parts 314 are formed of a flexible film. Each of the grip parts 314 is attached to the base part 313 with a space interposed therebetween. The space between the base part 313 and the grip part 314 is hollow, and the deformation sensor 316 is provided in the hollow space.

The deformation sensor 316 is an optical sensor such as a camera. A pattern or the like detectable by the deformation sensor 316 is provided on the surface of the grip part 314 on the side of the base part 313. For example, a point cloud pattern arranged in two dimensions is formed on the grip part 314.

The deformation sensor 316 captures an image of the point cloud pattern provided on the grip part 314. The positional relationship of respective points in the captured image changes according to the deformation of the grip part 314. That is, the position of each point in the captured image changes according to the amount of deformation of the grip part 314. Therefore, by capturing an image the point cloud pattern of the grip part 314, the deformed shape of the grip part 314 can be detected. The grip part 314 detects an outer shape of the contacting point in contact with the object O. The deformation sensor 316 can measure only the part of the shape of the grip part 314 that is brought into contact with the object O, that is, can measure the partial shape of the object O.

Returning to the description of FIG. 1. The three-dimensional shape measuring instrument 200 is a measuring instrument for measuring a three-dimensional shape of the object O. The three-dimensional shape measuring instrument 200 is, for example, a three-dimensional scanner. The three-dimensional shape measuring instrument 200 includes a table 210 and a depth sensor 220. The table 210 has a mounting surface parallel to a horizontal plane. A user or robot places the object O to be measured on the table 210.

The depth sensor 220 measures a distance to (depth of) the object O on the table 210. The depth sensor 220 is, for example, a LiDAR, a stereo camera, or a depth camera, and captures a depth image. The table 210 rotates the object O about a rotation axis parallel to the vertical direction. While the table 210 rotates the object O, the depth sensor 220 measures a distance to the surface of the object O.

In this way, the three-dimensional shape measuring instrument 200 can obtain measurement data indicating a three-dimensional shape of an entire circumference of the object O. The measurement data has a plurality of ranging data pieces indicating the distance from the depth sensor 220 to the object O. Since the object O can be measured during the rotation of the table 210, the distance from any direction to the surface of the object O can be measured. Furthermore, in order to measure the shape of the bottom or top surface of the object O, the three-dimensional shape measuring instrument 200 may perform the measurement by changing the orientation of the object O on the table 210.

The detection result of the depth sensor 220 provides three-dimensional shape data of the object. That is, the depth sensor 220 obtains three-dimensional shape data by detecting the distance to the surface of the object. The three-dimensional shape data is a depth image showing the surface shape of the object O, that is, the boundary between the object O and space.

The measurement data measured by the three-dimensional shape measuring instrument 200 is, for example, point cloud data including a plurality of points. Each point includes information about three-dimensional coordinates in a sensor coordinate system of the three-dimensional shape measuring instrument 200. The measurement data may be mesh data. The mesh data is composed of a triangular mesh (tri-mesh) connecting three adjacent points and a square mesh (quad-mesh) connecting four adjacent points. The three-dimensional shape measuring instrument 200 outputs the measurement data to the processing apparatus 100.

The ranging sensor 500 measures the distance to the object O in order to measure the surface shape of the object O. The ranging sensor 500 is a LiDar, a laser rangefinder, a depth camera, an ultrasonic sensor, a stereo camera, or the like. The data measured by the ranging sensor 500 is used as surface shape data. The ranging sensor 500 measures surface shape data indicating the surface shape of at least a part of the object O. The surface shape data is not limited to data showing the overall surface shape of the object O, but may be data showing the surface shape of a part of the object O. The surface shape of the object O with no CAD data or the like can be measured.

The processing apparatus 100 is an information processing apparatus of a personal computer. For example, the processing apparatus 100 includes a memory, a processor, various interfaces, an input device, an output device, a monitor, and so on. When the processor of the processing apparatus 100 executes a program stored in the memory, the processing described later is performed. Furthermore, the processing apparatus 100 is an information processing apparatus that can communicate in a wireless or wired manner.

The processing apparatus 100 acquires the surface shape data from the ranging sensor 500. The processing apparatus 100 acquires the three-dimensional shape data from the three-dimensional shape measuring instrument 200. The, the processing apparatus 100 sets a coordinate system on the three-dimensional shape data to create a three-dimensional model. Furthermore, the processing apparatus 100 controls the arm mechanism 400 and the end effector 300.

Figure 3:
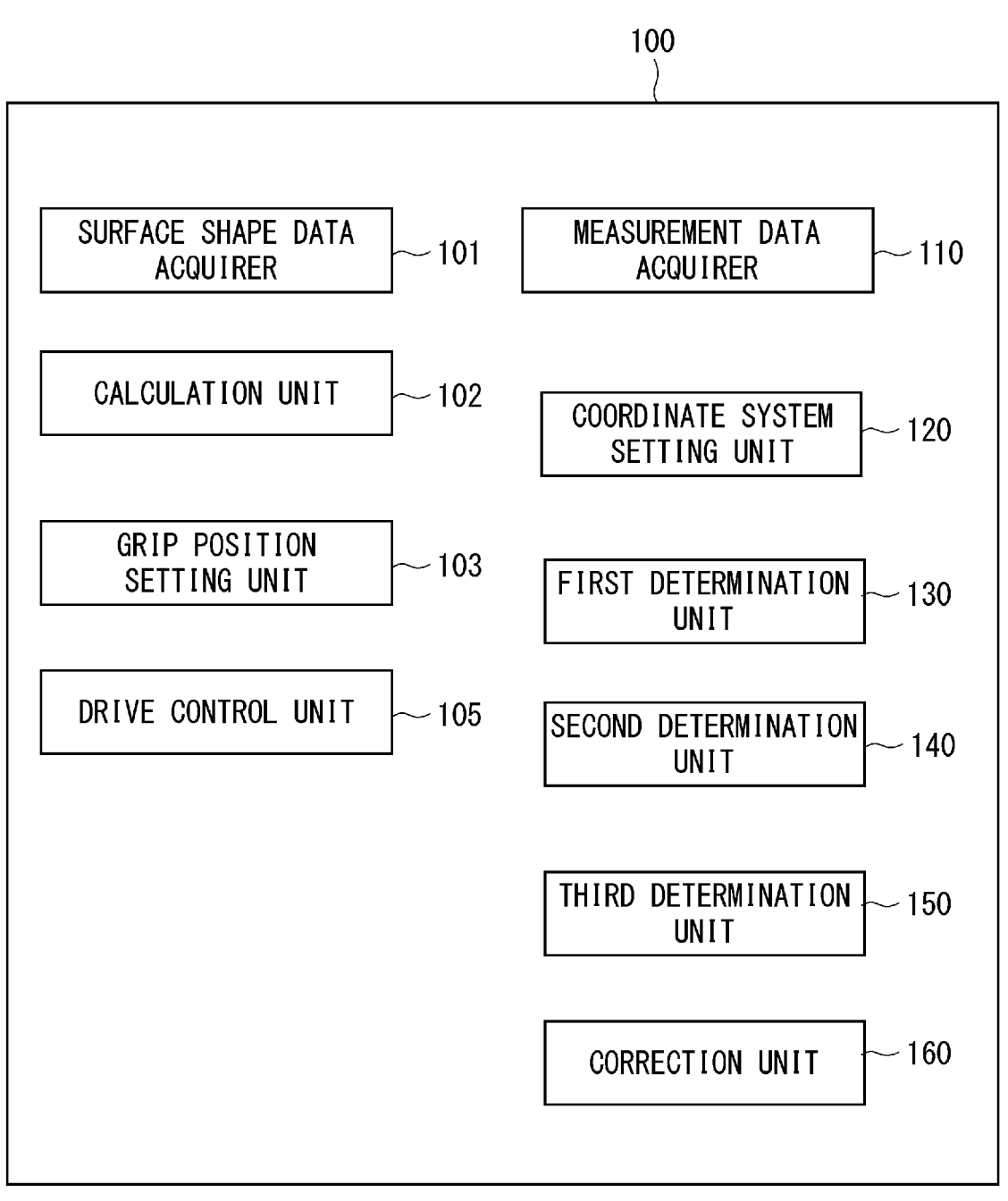
FIG. 3 is a block diagram showing a configuration of a processing apparatus.

The processing apparatus 100 will be described in detail with reference to FIG. 3. FIG. 3 is a control block diagram showing a configuration of the processing apparatus 100. The processing apparatus 100 includes a surface shape data acquisition unit 101, a calculation unit 102, a grip position setting unit 103, and a drive control unit 105. The processing apparatus 100 further includes a measurement data acquisition unit 110, a coordinate system setting unit 120, a first determination unit 130, a second determination unit 140, a third determination unit 150, and a correction unit 160.

(Acquisition of Three-Dimensional Shape Data)

First, the processing for acquiring the three-dimensional shape data of the object O is described. The surface shape data acquisition unit 101 acquires the surface shape data measured by the ranging sensor 500. The surface shape data is data showing a partial shape of the object O. The surface shape data includes data showing the distance from the ranging sensor 500 to a plurality of points of the object O. The surface shape data are, for example, point cloud data and mesh data.

The calculation unit 102 calculates a normal direction of the surface of the object O from the surface shape data. Next, the calculation unit 102 obtains the distribution of the normal direction of the surface of the object O. That is, the calculation unit 102 calculates the normal at each point of the object O. The surface shape data is, for example, the point cloud data or the mesh data. The calculation unit 102 can determine the normal direction from the point cloud data or the mesh data. The normal is a direction perpendicular to the surface of the object O. The normal direction is different depending on the position of the object O.

The grip position setting unit 103 sets the grip position of the object O where the object is gripped by the end effector 300 based on the normal direction. The grip position setting unit 103 searches for the optimum grip position based on the distribution in the normal direction.

The drive control unit 105 controls the end effector 300 and the arm mechanism 400 so that the end effector 300 grips the object O at the grip position. The drive control unit 105 outputs command values and the like to each motor of the end effector 300 and the arm mechanism 400. In this way, the end effector 300 can grip the object O at the grip position set by the grip position setting unit 103. At the grip position of the object O, the claw parts 315 are driven and the grip parts 314 pinch the object O.

For example, the grip position setting unit 103 obtains a cross section (also referred to as a grip cross section) to be the grip position of the object O based on the distribution in the normal direction. The grip position in the object O can be the position where the outer shape (outline) of the cross section of the object O is closest to a circle. That is, the grip position setting unit 103 sets the cross section of the object O closest to a circle as the grip position (grip cross section).

Specifically, as shown in Non-Patent Literature 1, the grip position setting unit 103 searches an antipode point of the object O and outputs a candidate of the gripping posture. The antipode point is a point that passes through the center of the object O from one point of the object O and is on the opposite side of the object O. The grip position setting unit 103 pairs the object O with an arbitrary point and its antipode point and finds its normal direction. For each candidate, the grip position setting unit 103 calculates a point group normal on the plane and selects a portion that can best fit to a circle as the grip position posture. If the cross section is circular, the normal directions of the two paired points are parallel. Therefore, it is possible to search for a cross section close to a circle by determining the amount of deviation in the normal direction of two paired points. The grip position setting unit 103 sets the grip position of the object O based on the surface shape data.

The drive control unit 115 drives the arm mechanism 400 so that the end effector 300 moves to the grip position. For example, the drive control unit 115 outputs a control command value to a motor that drives each joint of the arm mechanism 400. Thus, the end effector 300 is moved onto a plane passing through the grip cross section. At the grip cross section, the grip parts 314 are placed on both sides of the object O. The drive control unit 105 then drives the actuator 317 of the end effector. This brings the grip parts 314 into contact with the object O, and the object O is gripped, as shown in FIG. 2. The grip parts 314 are brought into contact with the object O at the grip cross section.

In this way, the grip parts 314 shown in FIG. 2 pinch the object O at the grip position where the cross section is closest to a circle. The end effector 300 can stably grip the object O. The end effector 300 can grip the object O in a stable position posture.

The coordinate system setting unit 120 sets an initial reference coordinate system for the three-dimensional model of the object O. The coordinate system setting unit 120 sets XYZ three-dimensional orthogonal coordinate system as the initial reference coordinate system. The coordinate system setting unit 120 sets an origin and directions of the X, Y, and Z axes for the three-dimensional model. The X, Y, and Z axes are directions perpendicular to each other.

The coordinate system setting unit 120 sets the initial reference coordinate system based on the deformed shape data from the deformation sensors 316. One axis of the coordinate system is perpendicular to the grip cross section. The one axis of the coordinate system passes through the center of the two grip parts 314 at the grip cross section.

The shape of the object O in the grip cross section is obtained from the deformed shape of the grip parts 314. In the grip cross section, the object O has a shape close to a circle. The coordinate system setting unit 120 sets the initial reference coordinate system so that the axis of the initial reference coordinate system passes through the center or center of gravity of the object O. That is, the center (origin) of the initial reference coordinate system is made to match the center (center of gravity) of the grip cross section. For example, if the object O is rotationally symmetric, the axis of symmetry of the object O can be made to match the axis of the initial reference coordinate system.

Next, the drive control unit 105 controls the arm mechanism 400 and the end effector 300 so that the object O is placed within a scan range of the three-dimensional shape measuring instrument 200. Under control by the drive control unit 105, the arm mechanism 400 and the end effector 300 place the object O on the table 210. Specifically, the arm mechanism 400 moves the object O so that the axis of the initial reference coordinate system is aligned with the center of the scan range. For example, as shown in FIG. 1, the axis of the initial reference coordinate system is the central axis passing through the center or center of gravity of the object O. Therefore, the drive control unit 105 controls the arm mechanism 400 and the end effector 300 so that the central axis matches the rotation axis of the table. Next, the three-dimensional shape measuring instrument 200 rotates the table 210 to measure the three-dimensional shape of the object O.

The center position of the object O can be aligned with the center of the scan range in a posture that is as close as possible to the posture of the object O at the time of being gripped. The number of times the object O is repositioned for three-dimensional scanning by the three-dimensional shape measuring instrument 200 can be reduced. For example, at any scanning angle (rotation angle) of the table 210, a part of the object O can be prevented from going out of the scan range. Moreover, the three-dimensional shape measuring instrument 200 can stably and efficiently perform three-dimensional measurement. A three-dimensional model with an appropriate coordinate system can be generated.

The measurement data acquisition unit 110 acquires the measurement data measured by the three-dimensional shape measuring instrument 200. As described above, the measurement data is the point cloud data and the mesh data indicating the three-dimensional shape of the object. That is, the processing apparatus 100 acquires data (three-dimensional data) of the three-dimensional model indicating the three-dimensional shape. Furthermore, the measurement data is acquired in the coordinate system set by the coordinate system setting unit 120. That is, the measurement data is indicated by position coordinates (XYZ coordinates) on the XYZ axis of the initial reference coordinate system set by the coordinate system setting unit 120.

Hereinafter, the measurement data acquisition unit 110 is described as acquiring the mesh model indicating the three-dimensional shape. Obviously, the measurement data acquisition unit 110 may acquire the point cloud data from the three-dimensional shape measuring instrument 200, and the processing apparatus 100 may generate the mesh data from the point cloud data. The relative position relationship between the three-dimensional shape measuring instrument 200 and the placed point is known. Thus, it is possible to associate the three-dimensional model of the object O with the axis derived from the end effector 300.

(Determination of Symmetry)

In addition, the processing apparatus 100 may, as an option, determine the symmetry of the three-dimensional model. Specifically, the processing apparatus 100 determines the symmetry for each axis of the reference coordinate system. Then, the processing apparatus 100 corrects the axis of the reference coordinate system according to the result of the determination of the symmetry.

Here, in the three-dimensional model indicating the three-dimensional shape of the object, it is desirable to set coordinate axes of a coordinate system appropriately. For example, if the object is rotationally symmetric, the position and posture of the object can be appropriately changed by setting a coordinate axis that matches a rotation axis. It is desirable to determine the symmetry of the object appropriately. In the method according to this embodiment, the symmetry of the object can be determined appropriately. In this way, it becomes possible to set a useful coordinate system for the estimation of a six-axis position and posture in the estimator. Hereinafter, a configuration related to the determination of symmetry is described.

The first determination unit 130 determines rotational symmetry of the object O. The first determination unit 130 determines whether or not, for each of the three axes, the object O has rotational symmetry. For example, for the X-axis, if the object O has a rotationally symmetric shape, the X-axis is a rotationally symmetric axis. Thus, if the object is rotated at an angle around the X-axis, the shape of the object will match the original shape thereof.

The second determination unit 140 determines whether or not the object O is rotationally symmetric with an angular period. If there is a rotationally symmetric axis, the second determination unit 140 determines whether or not the rotational symmetry about that axis has an angular period. For example, if the X-axis is a rotationally symmetric axis, the second determination unit 140 determines whether or not the X-axis has a rotationally symmetric shape with an angular period.

An example of the rotationally symmetric shape with an angular period is a regular polygon in a cross section perpendicular to the axis. Specifically, if the cross section is square, the object will have a four-fold rotational symmetric shape. An example of a rotationally symmetric shape without an angular period is, for example, circular in a cross section perpendicular to the axis.

The third determination unit 150 determines the plane symmetry. When an object shape has plane symmetry, the shape is inversely symmetric with respect to the plane. When the object shape is inversely symmetric with respect to the plane including an axis, the third determination unit 150 determines that the object is plane symmetric.

The correction unit 160 corrects the reference coordinate system. When the second determination unit 140 determines that the object is rotational symmetric with an angular period, the correction unit 160 corrects the reference coordinate system. By doing so, a reference coordinate system different from the initial reference coordinate system is set. Specifically, the correction unit 160 corrects an orientation of an axis that is not a rotationally symmetric axis. For example, if the X-axis is a rotationally symmetric axis, the correction unit 160 changes the orientations of the Y-axis and the Z-axis. The correction unit 160 rotates the Y-axis and the Z-axis around the X-axis.

When the third determination unit 150 determines that the object O has plane symmetry, the correction unit 160 corrects the reference coordinate system. That is, the axial direction of the reference coordinate system is changed so that the axis is included within the plane of symmetry. In this way, the reference coordinate system can be set with two axes parallel to the plane of symmetry as the coordinate axes.

The method for generating a three-dimensional model according to this embodiment will be described using FIG. 4. FIG. 4 is a flowchart showing the method for generating a three-dimensional model according to this embodiment.

First, the surface shape data acquisition unit 101 acquires surface shape data of the object O (S11). Thus, the surface shape data measured by the ranging sensor 500 is acquired. Here, the surface shape data is point cloud data and mesh data indicating the surface of the object O. Here, the surface shape data is explained as the mesh data.

Next, the calculation unit 102 calculates the normal direction of the surface of the object O based on the surface shape data (S12). Thus, the normal direction distribution of the surface of the object O is obtained. The grip position setting unit 103 sets the grip position based on the normal direction (S13). Here, as described above, the calculation unit 102 sets a cross section close to the circle as the grip position of the object O.

The end effector 300 grips the object O at the grip position (S14). That is, after the arm mechanism 400 moves the end effector 300 to the grip position, the end effector 300 grips the object O.

Here, the flexible grip parts 314 grips the object O. Therefore, the grip parts 314 deform according to the outer shape of the object O. Then, the deformation sensors 316 detect the deformed shapes of the grip parts 314 (S15).

The coordinate system setting unit 120 sets an initial reference coordinate system according to the deformed shapes of the grip parts 314 (S16). As described above, since the grip parts 314 are formed of a flexible material, the grip parts 314 deform along the object O being gripped. Therefore, the coordinate system setting unit 120 can set the axial direction of the initial reference coordinate system according to the deformed shapes of the grip parts 314.

The end effector 300 and the arm mechanism 400 place the object O on the table 210 (S17). Here, the arm mechanism 400 moves the object O so that the object O is placed within the scan range of the three-dimensional shape measuring instrument 200. More specifically, the object O is placed on the three-dimensional shape measuring instrument 200 so that the axial direction of the initial reference coordinate system matches the scan axis.

The three-dimensional shape measuring instrument 200 scans the object O (S18). The three-dimensional shape measuring instrument 200 scans the entire circumference of the object O to perform measurement. The measurement data acquisition unit 110 acquires the measurement data in the initial reference coordinate system (S19). That is, a three-dimensional shape model of the object O in the XYZ three-dimensional orthogonal coordinate system set according to the deformed shapes of the grip parts 314 is obtained.

Figure 5:
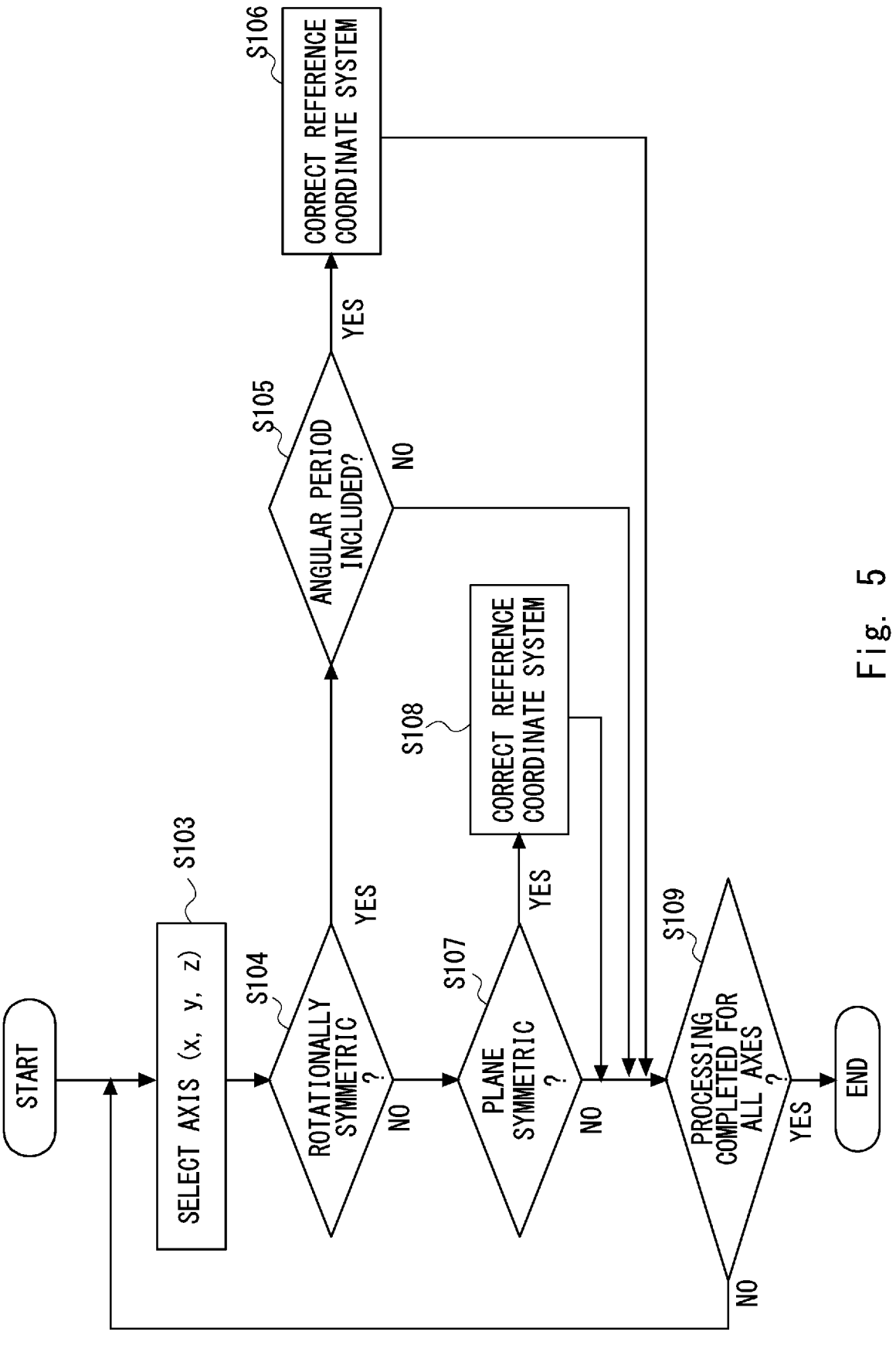
FIG. 5 is a flowchart showing a method for generating a three-dimensional model according to the embodiment.

The processing for determining the symmetry of the three-dimensional model will be described with reference to FIG. 5. FIG. 5 is a flowchart for explaining an example of the processing for determining the symmetry. In the following explanation, the symmetry for each axis of the initial reference coordinate system derived in Step S15 is determined. Thus, the symmetry of the three-dimensional model corresponding to the measurement data measured in Step S18 is determined.

The first determination unit 130 selects an axis (x, y, z) in the initial reference coordinate system (S103). That is, the first determination unit 130 selects one axis from the x-axis, y-axis, and z-axis. The first determination unit 130 determines whether or not the object O is rotationally symmetric about the selected axis (S104). The rotationally symmetric shape is a shape whose shape when rotated about the selected axis matches the original shape thereof.

When the object O is rotationally symmetric (YES in S104), the second determination unit 140 determines whether or not the rotational symmetry has an angular period (S105). That is, the third determination unit 150 determines whether or not the object O has a rotationally symmetric shape with an angular period. A rotationally symmetric shape with an angular period is a shape whose shape matches the original shape thereof when rotated around the selected axis by a predetermined angle (an angle greater than 0 degrees and less than 360 degrees). In other words, the shape when rotated around the axis by an angle other than the angle indicated by the angular period does not match the original shape thereof.

If the rotational symmetry has an angular period (YES in S105), the correction unit 160 corrects the reference coordinate system (S106). The correction unit 160 changes the directions of two axes other than the selected axis in the initial reference coordinate system. This determines the directions of the two axes in the plane perpendicular to the selected axis. Next, the processing transitions to Step S109. If the rotational symmetry does not have an angular period (NO in S105), the processing transitions to Step S109.

If the shape of the object O is not rotationally symmetric (NO in S104), the third determination unit 150 determines whether or not the shape of the object O is plane symmetric (S107). The plane symmetric shape is a shape of the object O in which the shape when the object O is inverted matches the original shape thereof in the plane including the selected axis. If the shape of the object O is plane symmetric (YES in S107), the correction unit 160 corrects the reference coordinate system (S108). The correction unit 160 changes the directions of two axes other than the selected axis in the initial reference coordinate system. Specifically, one axis other than the selected axis is made parallel to the plane of symmetry (inverted plane). Then, the processing transitions to S109.

If the object O is not plane symmetric (NO in S107), the processing transitions to S109. Next, the first determination unit 130 determines whether or not the processing is completed for all axes (S109). If the processing is not completed for all axes (NO in S109), the processing returns to Step S103, and the first determination unit 130 selects an axis. That is, the processing apparatus 100 performs the above processing for the axis whose symmetry has not been determined. For example, the processing of S104 to S108 is performed in the order of the z-axis, the y-axis, and the x-axis. If the processing is completed for all axes (YES in S109), the processing is ended.

Figure 6:
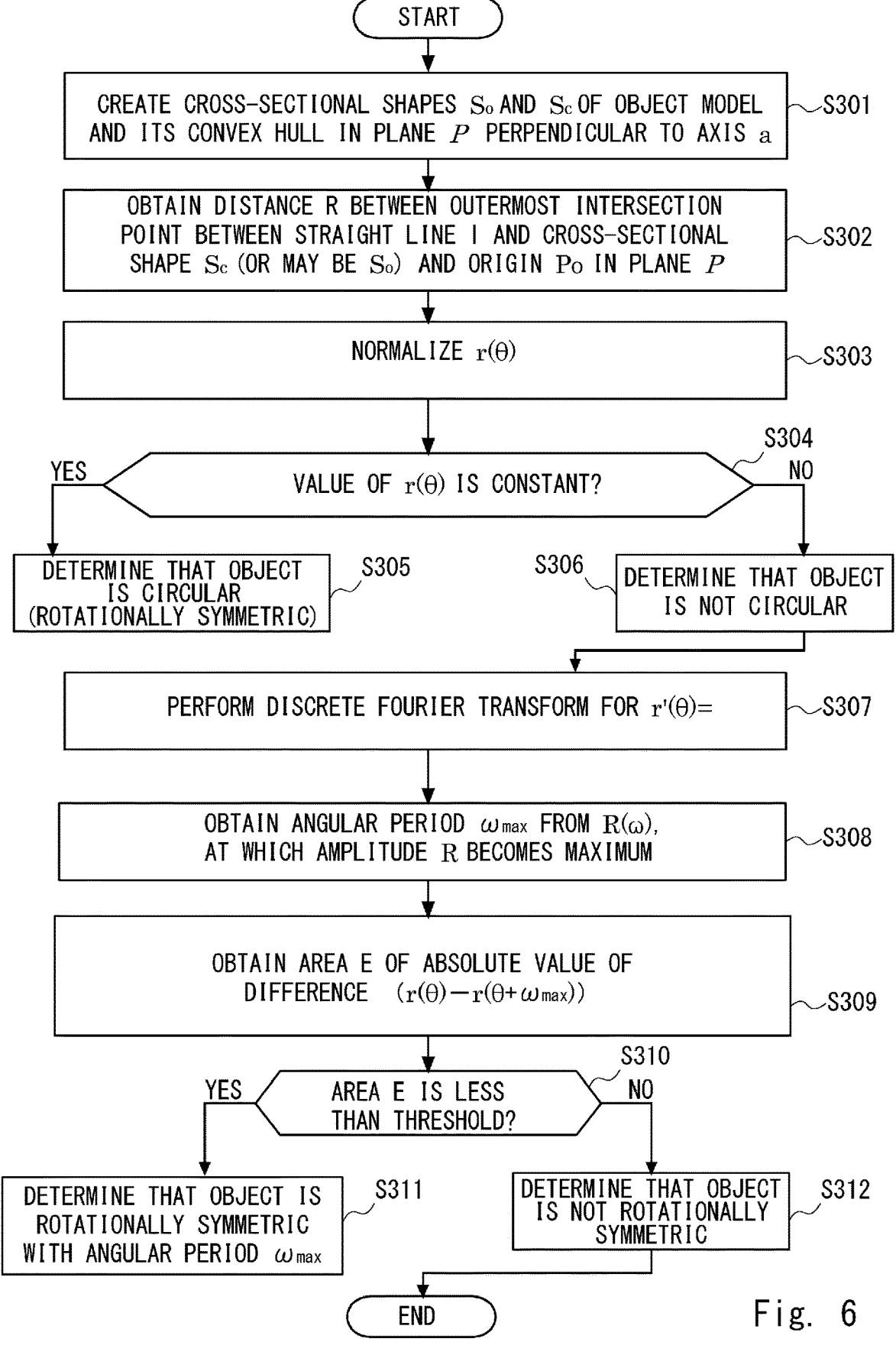
FIG. 6 is a flowchart showing processing of determining rotational symmetry.

FIG. 6 is a flowchart for describing one example of determination processing in the first determination unit 130 and the second determination unit 140. Here, the axis selected in Step S103 of the drawing is described as "a". That is, the axis a is one of the x-axis, y-axis, or z-axis in the initial reference coordinate system. In the following description, the axis a is described as the z-axis and a plane P perpendicular to the axis a is described as the xy plane.

In the plane P perpendicular to the axis a, the first determination unit 130 creates cross-sectional shapes So and Sc of an object model and its convex hull (S301). The cross-sectional shapes So and Sc are obtained from the intersection of the plane P and the object model. The cross-sectional shape So of the object is the shape showing an outline of the object in the plane P. The convex hull is the smallest polygon in the plane P containing the object (i.e., the cross-sectional shape So). The first determination unit 130 changes the position on the axis a to generate the cross-sectional shapes So and Sc. Therefore, for one object O, the first determination unit 130 generates a plurality of cross-sectional shapes So and a plurality of cross-sectional shapes Sc.

Figure 7:
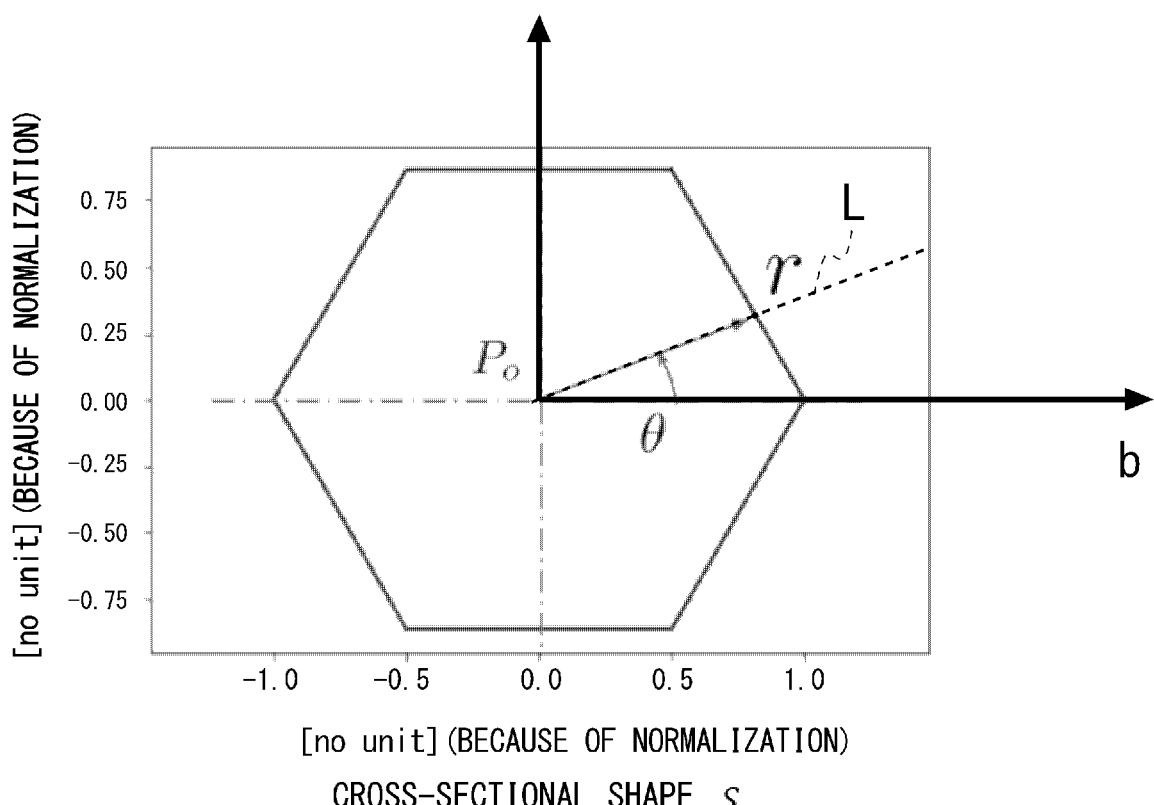
FIG. 7 is a diagram for explaining a cross-sectional shape Sc and r(θ) of a convex hull of an object.

The first determination unit 130 obtains a distance r between the outermost intersection point between a straight line 1 and the cross-sectional shape Sc (or may be So) and an origin Po in the plane P (S302). The cross-sectional shape Sc and its r are described with reference to FIG. 7. FIG. 7 shows the plane P. Here, the straight line 1 is parallel to the plane P and passes through the origin Po of the plane P, as shown in FIG. 7. Further, the straight line 1 starts at the origin P0. An angle formed by the straight line 1 and the x-axis in the plane P is $\theta$. On the straight line 1, the distance r indicates the distance between the origin Po and the outer shape of the cross-sectional shape Sc. If there are two or more intersection points between the straight line 1 and the cross-sectional shape Sc, the distance between the outermost intersection point and the origin Po is defined as r.

As described above, the first determination unit 130 may use the cross-sectional shape So of the object model instead of the cross-sectional shape Sc. Therefore, it is also possible to replace the cross-sectional shape Sc with the cross-sectional shape So in the following flow. When the cross-sectional shape So is used, the distance from the origin Po to the outer shape of the cross-sectional shape So on the straight line 1 is defined as the distance r. In the following description, an example of processing for the cross-sectional shape Sc is described. Therefore, as shown in FIG. 7, the distance from the origin Po to the intersection point between the straight line 1 and the cross-sectional shape Sc is described as the distance r.

Furthermore, the first determination unit 130 gradually changes $\theta$ to obtain the distance r. That is, in the plane P, the first determination unit 130 calculates r over the entire circumference of the circle around the origin Po. The first determination unit 130 obtains r by, for example, changing $\theta$ at intervals $\delta_\theta$. Thus, the first determination unit 130 can obtain a discrete function $r(\theta)$. For example, $\theta$ takes a discrete value from 0 degrees to 360 degrees. $r(\theta)$ is a polar coordinate representation of the cross-sectional shape Sc. That is, $r(\theta)$ corresponds to a function obtained by transforming the polar coordinate of the cross-sectional shape Sc. Furthermore, the first determination unit 130 calculates $r(\theta)$ for each of the plurality of cross-sectional shapes Sc generated by changing the position on the axis a (in this case, the z position).

The first determination unit 130 normalizes $r(\theta)$ (S303). For example, the first determination unit 130 multiplies $r(\theta)$ by a constant coefficient so that the maximum value of $r(\theta)$ becomes 1. As a result, $r(\theta)$ falls within a range from 0 to 1. The first determination unit 130 determines whether or not the value of $r(\theta)$ is constant (S304). That is, the first determination unit 130 determines whether or not the cross-sectional shape Sc is circular. More specifically, the first determination unit 130 determines whether or not the outer shape of the cross-sectional shape Sc is circular.

When $r(\theta)$ is constant (YES in S304), the first determination unit 130 determines that the object is circular (rotationally symmetric) (S305). When it is determined that the object is circular, the processing of the first determination unit 130 and the second determination unit 140 ends. That is, the determination in Step S105 of FIG. 2 becomes NO. Examples of three-dimensional objects whose cross-sectional shapes are circular include spheres, cylinders, cones, and rugby balls. Other examples of three-dimensional objects whose cross-sectional shapes are circular include jars, bottles, and others whose diameters vary depending on the position of axis a. These shapes are rotationally symmetric about the central axis.

When $r(\theta)$ is not constant (NO in S304), the first determination unit 130 determines that the object is not circular (S306). Next, the second determination unit 140 determines whether or not the object has rotational symmetry with an angular period. That is, the determination processing in Step S105 of FIG. 2 is performed.

Figure 8:
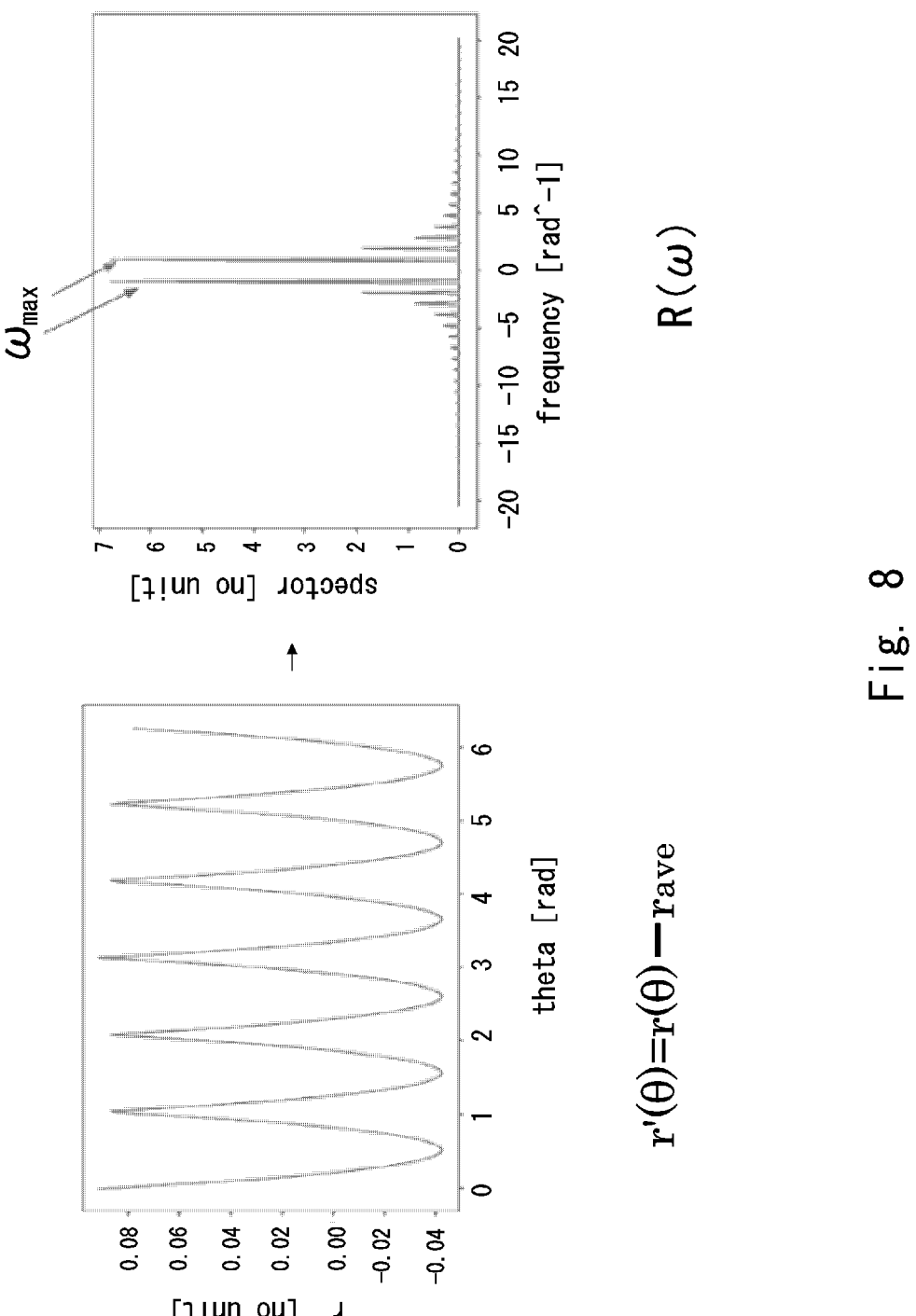
FIG. 8 is a graph showing r'(θ) and its Fourier transform.

The second determination unit 140 performs a discrete Fourier transform for $r'(\theta)$ (S307). Here, $r'(\theta)$ is calculated from $r(\theta)$ and an average value of r and $r_{ave}$. Specifically, $r'(\theta) = r(\theta) - r_{ave}$. The average value $r_{ave}$ corresponds to the DC component of r. The Fourier series (amplitude spectrum) $R(\omega)$ obtained by the discrete Fourier transform is shown in FIG. 8. The graph on the left side of FIG. 8 shows $r'(\theta)$ and the graph on the right side thereof shows $R(\omega)$. Note that when the cross-sectional shape Sc is a regular hexagon as shown in FIG. 7, there is a peak every 60 degrees in $R(\omega)$ shown in FIG. 8. Also, in FIG. 8, the real function is Fourier transformed, so the graph is symmetrical on the negative and positive sides.

The second determination unit 140 obtains an angular period $\omega_{max}$ from $R(\omega)$, at which an amplitude R becomes maximum (S308). Here, $\omega_{max}$ is 0 degrees or more and 180 degrees or less. In FIG. 8, the highest peak appears at R (60 degrees), so $\omega_{max}$ is 60 degrees ($= \pi/3$ [rad]).

The second determination unit 140 obtains an area E of an absolute value of a difference $(r(\theta) - 40 + \omega_{max}))$ (S309). Here, the difference indicates a difference value between the function $r(\theta)$ and the function $r(\theta + \omega_{max})$ obtained by shifting the function $r(\theta)$ by the angular period $\omega_{max}$. The area E of the absolute value can be calculated by the following Expression (1).

[Expression 1]

$$E = \int_{360°}^{0°} |r(\theta) - r(\theta + \omega_{max})| d\theta \tag{1}$$

The area E is obtained by integrating the absolute value over a range of 0 degrees to 360 degrees for $\theta$. Note that in Expression (1), since $\theta$ takes discrete values, the area E is the total sum of the absolute values within the range of 0 to 360°. The second determination unit 140 determines whether or not the area E is less than the threshold (S310). That is, the third determination unit 150 compares the area E with a preset threshold.

If the area E is less than the threshold (YES in S310), the second determination unit 140 determines that the object is rotationally symmetric (linearly symmetric) with the angular period $\omega_{max}$ (S311). That is, since the difference in the function when shifted by the angular period $\omega_{max}$ is small, the second determination unit 140 determines that the object is rotationally symmetric (linearly symmetric) with the angular period. If the area E is not less than the threshold (NO in S310), the second determination unit 140 determines that the object is not rotationally symmetric (linearly symmetric) with the angular period (S312).

Figure 9:
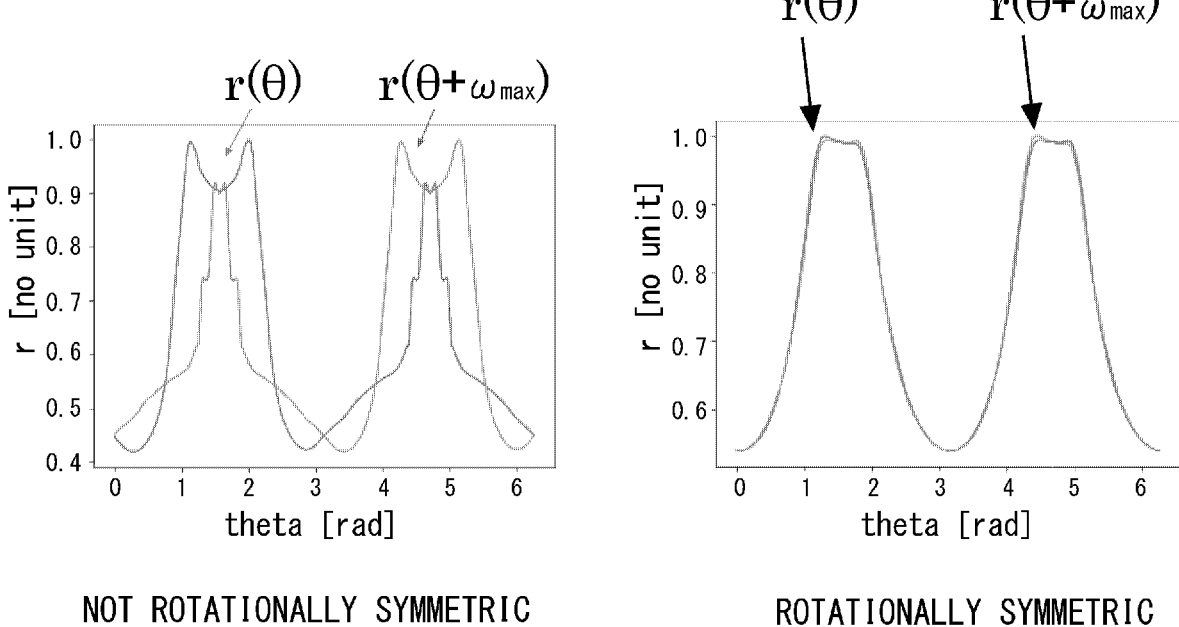
FIG. 9 is a graph showing a difference between r(θ) and r(θ+ω_{max})

FIG. 9 shows $r(\theta)$ and $r(\theta + \omega_{max})$. A graph on the left side of FIG. 9 is for an object that does not have a rotationally symmetric shape and a graph on the right side of FIG. 9 is for an object that has a rotationally symmetric shape. When the object is not rotationally symmetric, the difference between $r(\theta)$ and $r(\theta + \omega_{max})$ is not zero, and thus the area E obtained by Expression (1) becomes large. When the object is rotationally symmetric with an angular period, the function $r(\theta)$ substantially matches the function $r(\theta + \omega_{max})$. Therefore, the difference between $r(\theta)$ and $r(\theta + \omega_{max})$ becomes almost zero and the area E becomes almost zero for any $\theta$. Therefore, by comparing the area E with a preset threshold, the second determination unit 140 can determine whether or not the shape of the object is rotational symmetric with an angular period.

By changing the position on the axis a, a plurality of cross-sectional shapes Sc are generated. The determination of rotational symmetry is made for each of the cross-sectional shapes Sc. Therefore, if the value of $r(\theta)$ is constant for all the cross-sectional shapes Sc, it is determined that the object is rotational symmetric without an angular period. If the area E is not less than the threshold for one or more cross-sectional shapes Sc, it is determined that the object is rotational symmetric. For some cross-sectional shapes Sc, if the area E is less than the threshold and $r(\theta)$ is constant for all remaining cross-sectional shapes, it is determined that the object is rotational symmetric with an angular period.

Also, for all cross-sectional shapes Sc, even if the area E is less than the threshold, the object may not be rotational symmetric with an angular period if the angular period $\omega_{max}$ is different between cross-sectional shapes Sc. Specifically, if the angular periods $\omega_{max}$ max is different in all the cross-sectional shapes Sc and do not overlap, the object is not rotational symmetric with an angular period. For example, if the angular period $\omega_{max}$ is 60 degrees in one cross-sectional shape and the angular period $\omega_{max}$ is 72 degrees in the remaining cross-sectional shapes, the object is not rotational symmetric with an angular period. Conversely, if the angular period $\omega_{max}$ is 60 degrees in one cross-sectional shape and the angular period $\omega_{max}$ is 30 degrees in the remaining cross-sectional shapes, the object is rotational symmetric with an angular period. In other words, the object is six-fold rotational symmetric.

If the object is rotational symmetric with an angular period (S311), the correction unit 160 corrects the initial reference coordinate system as in Step S106 in FIG. 2. The correction unit 160 may correct the axial direction of the initial reference coordinate system based on a peak plane. For example, the correction unit 160 sets the reference coordinate system so that the direction of the angle $\theta_{max}$ at which $r(\theta)$ becomes maximum is the axial direction. The correction unit 160 specifies $\theta_{max}$ at which r becomes maximum. Here, $\omega_{max}$ is 0 degrees or more and less than 360 degrees.

The peak position is the position of the cross-sectional shape Sc or the cross-sectional shape So that becomes $r(\theta_{max})$. The correction unit 160 sets a straight line inclined from the x-axis by an angle $\theta_{max}$ as an axis b. In FIG. 7, $\theta_{max}$ is 0 degrees. The axis b is a straight line passing through the origin and the peak position. The plane containing the selected axis (axis a) and axis b is the peak plane. If there are a plurality of angles $\theta$ at which $r(\theta)$ becomes maximum, the axis b may be set based on the peak position of one of these angles.

Figure 10:
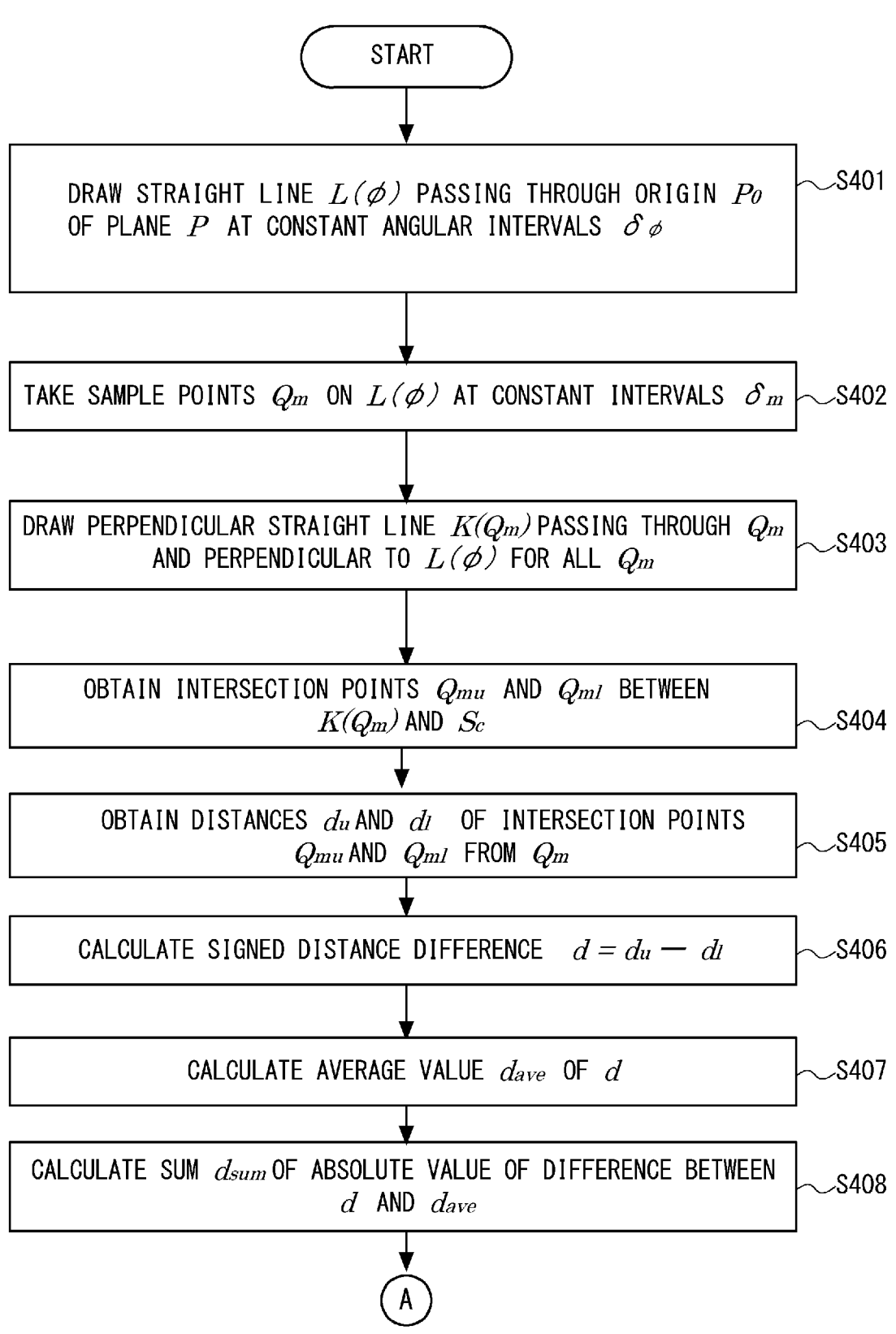
FIG. 10 is a flowchart showing processing of determining plane symmetry.
Figure 12:
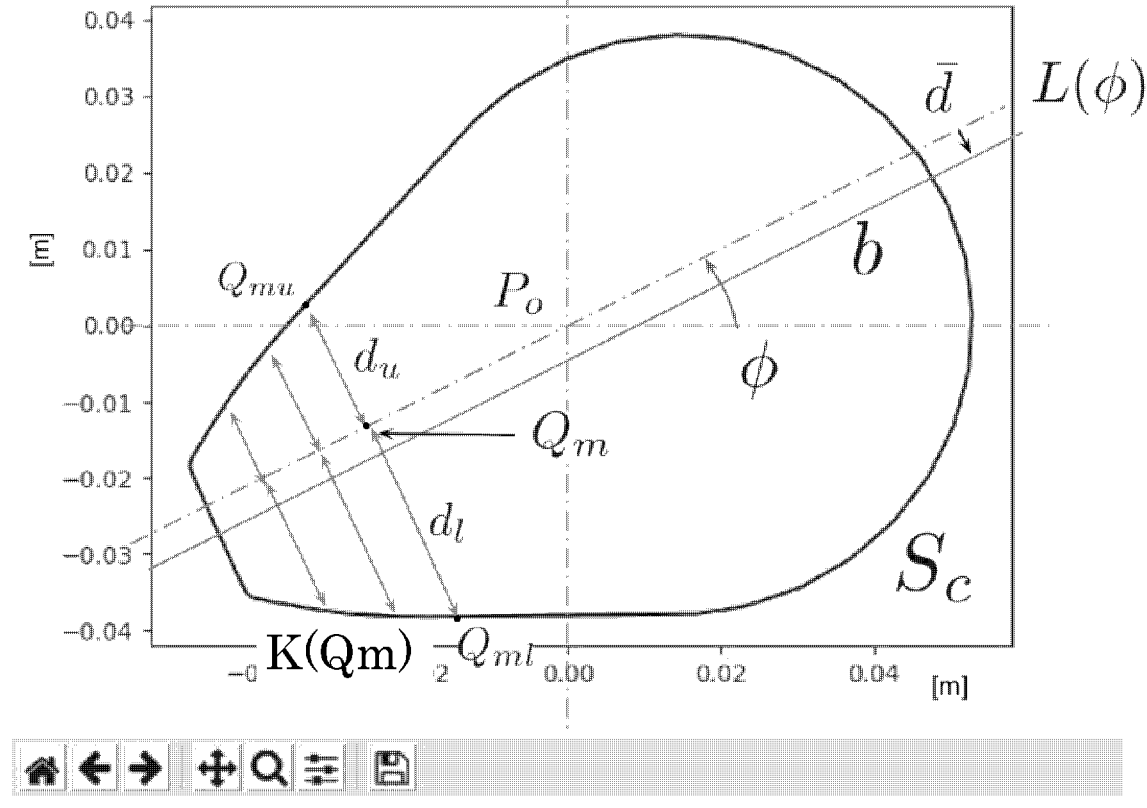
FIG. 12 shows a cross-sectional shape in the processing of determining the plane symmetry.

After Step S312, the third determination unit 150 determines the plane symmetry as in Step S107. An example of the determination about the plane symmetry will be described with reference to FIGS. 10 to 12. FIGS. 10 and 11 are flowcharts showing an example of the determination processing. FIG. 12 shows the plane-symmetric cross-sectional shape. In the following description, the processing is performed on the cross-sectional shape Sc of the convex hull, but it is also possible to perform the processing on the cross-sectional shape So of the object. Therefore, it is also possible to replace the cross-sectional shape Sc with the cross-sectional shape So in the following flow.

The third determination unit 150 draws straight lines $L(\varphi)$ passing through the origin Po of the plane P at a constant angular intervals $\delta_\varphi$ (S401). Thus, in the plane P, a plurality of the straight lines $L(\varphi)$ are set. Here, the straight line $L(\varphi)$ is, as shown in FIG. 12, a straight line on the plane P that passes through the origin Po and forms an angle $\varphi$ with the x-axis. That is, the angle $\varphi$ is the angle formed by the x-axis and the straight line $L(\varphi)$ in the plane P. Also, $\varphi$ is in the range of 0 or more and less than 180 degrees. The straight line $L(\varphi)$ is set to cross the cross-sectional shape Sc.

The third determination unit 150 takes sample points Qm on the straight line $L(\varphi)$ at constant intervals $\delta m$ (S402). Thus, a plurality of points on the straight line $(\varphi)$ can be sampled. The third determination unit 150 records xy coordinates of each sample point Qm. FIG. 12 shows the straight line $L(\varphi)$ and some of the sample points Qm on the straight line $L(\varphi)$. Only three sample points placed on one straight line $L(\varphi)$ are shown here. In addition, the third determination unit 150 draws the plurality of straight lines $L(\varphi)$ by changing the angle $\varphi$. The third determination unit 150 obtains the plurality of sample points Qm on each straight line $L(\varphi)$. Unless otherwise noted in the following description, the same processing is performed for each cross-sectional shape.

For all sample points Qm, the third determination unit 150 draws a perpendicular straight line K(Qm) passing through Qm and perpendicular to the straight line $L(\varphi)$ (S403). The third determination unit 150 obtains the intersection points Qmu and Qml between K(Qm) and the cross-sectional shape Sc (S404). Here, as shown in FIG. 12, since K(Qm) is a straight line crossing the cross-sectional shape Sc of the convex hull, K(Qm) intersects the cross-sectional shape Sc at two points. Therefore, as shown in FIG. 11, the positive intersection point between K(Qm) and the cross-sectional shape Sc is defined as Qmu, and the negative intersection point between K(Qm) and the cross-sectional shape Sc is defined as Qml. When K(Qm) intersects the cross-sectional shape Sc at three or more points, the outermost intersection point on the positive side is defined as Qmu, and the outermost intersection point on the negative side is defined as Qml.

The third determination unit 150 obtains the distances du and dl of the intersection points Qmu and Qml, respectively, from the sample point Qm (S405). The third determination unit 150 determines the distance du between the sample point Qm and the intersection point Qmu and the distance dl between the sample point Qm and the intersection point Qml as shown in FIG. 12.

Next, the third determination unit 150 calculates the signed distance difference $d=du-dl$ (S406). The third determination unit 150 calculates the average value $d_{ave}$ of d (S407). The third determination unit 150 calculates the average value $d_{ave}$ by calculating the sum of d and dividing the sum by the number of sample points for the plurality of sample points Qm on one straight line $L(\varphi)$. The third determination unit 150 calculates the sum $d_{sum}$ of the absolute values of the difference between d and $d_{ave}$ (S408). The sum $d_{sum}$ can be obtained by the following Expression (2).

[Expression 2]

$$d_{sum}=\Sigma|d-d_{ave}| \tag{2}$$

The third determination unit 150 determines the angle $\varphi_{min}$ at which the sum $d_{sum}$ becomes the minimum (S409). As described above, the signed distance difference d, the average value $d_{ave}$, and the sum $d_{sum}$ are obtained for each angle $\varphi$. That is, for each of the straight lines $L(\varphi)$, the third determination unit 150 calculates the signed distance difference d, the average value $d_{ave}$, and the sum $d_{sum}$, by performing the above processing. The third determination unit compares the plurality of sums $d_{sum}$ to obtain the minimum sum $d_{sum}$, and obtains the angle $\varphi$ of the straight line $L(\varphi)$ at that time. The angle $\varphi$ at which the cross-sectional shape Sc is closest to the line symmetry (inversion symmetry) for the straight line $L(\varphi)$ is set as the angle $\varphi_{min}$.

The third determination unit 150 obtains the average value $d_{ave\_min}$ and the sum $d_{sum\_min}$ of the signed distance difference d at the angle $\varphi_{min}$ (S410). The third determination unit 150 determines whether or not the sum $d_{sum\_min}$ is less than a threshold (S411). The third determination unit 150 compares the sum $d_{sum\_min}$ with a preset threshold.

If the sum $d_{sum\_min}$ is not less than the threshold (NO in S411), the third determination unit 150 determines that the object is not symmetric (S412). That is, for axis a, the cross-sectional shape Sc (or the cross-sectional shape So) is neither rotationally symmetric nor plane symmetric. Thus, the object has no symmetry about the axis a.

Figure 13:
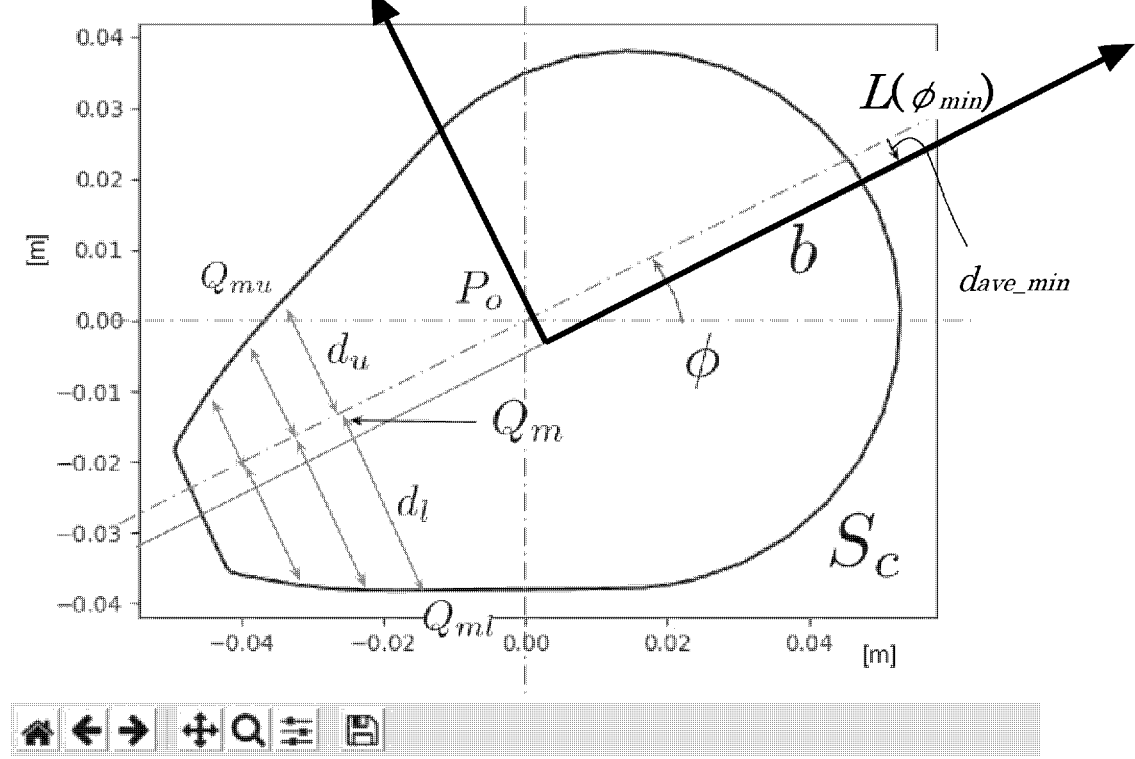
FIG. 13 is a diagram for explaining processing of correcting an axis in the processing of determining the plane symmetry.

If the sum $d_{sum\_min}$ is less than the threshold (YES in S411), the correction unit 160 sets the axis b based on $\varphi_{min}$ and $d_{ave\_min}$ (S413). Specifically, the axis b is a straight line with an angle of $\varphi$ with respect to the x-axis and separated by $d_{ave\_min}$ from the origin Po. FIG. 13 shows the axis b in the plane P perpendicular to the z-axis. The axis b corresponds to a straight line which is obtained by translating the straight line L($\varphi$min) by $d_{ave\_min}$ in the direction perpendicular to the straight line. Also, the position of the origin Po is similarly translated. The direction perpendicular to the axis b and perpendicular to the axis a becomes the remaining axis c. The third determination unit 150 determines that the object is plane symmetric with respect to the plane including the axis a and the axis b (inverted plane) (S414). Thus, when the object O has plane symmetry, the correction unit 160 corrects the axial direction of the initial reference coordinate system so that the initial reference coordinate system has an axis along the inverted plane.

Note that the processing of determining the plane symmetry shown in FIGS. 10 and 11 is performed for each cross-sectional shape Sc. Then, for all cross-sectional shapes Sc, if the sum $d_{sum\_min}$ is less than the threshold and the axis b is common, the object is determined to be the surface symmetric. The processing shown in FIGS. 3 to 11 is an example of the determination processing, and this embodiment is not limited to the above processing.

The system 1 performs the above determination processing on each of the three axes of the initial reference coordinate system. That is, the symmetry on each of the three axes is determined. If it is determined that the object is rotationally symmetric with no angular period on two or more axes, the object is determined to have a spherical shape. If the object is rotationally symmetric on one axis and plane symmetric on the other, the object has two symmetries, such as a cylinder or a rugby ball shape. If the object is rotationally symmetric on one axis, it can be determined whether or not the object has symmetry with an angular period (discrete symmetry) or a symmetry with an angular period. Discrete symmetrical cross-sectional shapes include regular polygons and star-shaped shapes. Various symmetries can be determined by the above algorithm.

In summary, the system 1 includes the end effector 300, the deformation sensor 316, the calculation unit 102, the grip position setting unit 103, and the coordinate system setting unit 120. The end effector 300 has the flexible grip parts 314 for gripping the object O. The deformation sensor 316 detects the deformed shapes of the grip parts which are gripping the object. The calculation unit 102 calculates the normal direction of the surface of the object from the surface shape data of the object. The grip position setting unit 103 determines the grip position of the object O by the end effector 300 based on the normal direction. The coordinate system setting unit 120 sets a reference coordinate system according to the deformed shapes of the grip parts 314.

In addition, the method of generating a three-dimensional model performs the following processing.

(A) The calculation unit 102 calculates a normal direction of a surface of an object according to surface shape data of the object;

(B) The grip position setting unit 103 sets a grip position of the object O based on the normal direction;

(C) The end effector 300 including the flexible grip parts 314 grips the object at the grip position;

(D) The deformation sensors 316 detect the deformed shapes of the grip parts when the object is gripped; and (E) A reference coordinate system is set according to the deformed shape of the grip parts 314.

In this way, a three-dimensional model with an appropriate coordinate system can be easily generated.

The processing apparatus 100 may also perform the following processing (1) to (6).

(1) Obtain measurement data showing the three-dimensional shape of the object in the reference coordinate system;

(2) Select an axis of the initial reference coordinate system;

(3) Determine whether or not there is rotational symmetry with respect to the axis;

(4) Determine whether or not there is rotational symmetry with respect to the axis having an angular period;

(5) If there is no rotational symmetry, determine plane symmetry with respect to the axis; and (6) Perform the processing of (3)-(5) for each of the three axes of the initial reference coordinate system by changing the axis selected in (2).

In this way, an appropriate coordinate system can be set. A three-dimensional coordinate system set as above is then used to represent a three-dimensional model of the object. In other words, a three-dimensional model showing the three-dimensional shape of the object is represented in the appropriate coordinate system. For example, a point cloud indicating a three-dimensional model or the position coordinates of a mesh are represented in the appropriate coordinate system. Information about various symmetries can be annotated. Three-dimensional shape models can be created with coordinate axes taking symmetry into consideration. Of course, the processing (1) to (6) may be omitted.

The processing apparatus 100 derives initial reference coordinates from the three-dimensional model. Then, the processing apparatus 100 can perform the calculation efficiently by sequentially searching the rotational symmetry and the plane symmetry in each axis. Information about coordinate system settings and symmetry for three-dimensional shape models of objects can be annotated. Three-dimensional models in appropriate coordinate systems can be efficiently generated.

For objects with symmetry, the axis of the coordinate system defines the axis of symmetry or the plane of symmetry (inverted plane). When the object has rotational symmetry with an angular period or plane symmetry, the correction unit 160 corrects the initial reference coordinate system. By using the axes of the corrected coordinate system, the position and posture of the object can be changed appropriately. Creation of learning data can be done easily and appropriately. Furthermore, position and posture information indicating position and posture can be annotated appropriately and simply to the learning data. It then becomes possible to set a useful coordinate system for the estimation of six-axis position and posture in the estimator.

The coordinate system setting unit 120 may derive the initial reference coordinates based on the direction of the normal to each mesh of the mesh model showing the three-dimensional shape. Thus, an appropriate initial reference coordinate system can be easily determined.

The coordinate system setting unit 120 defines a cuboid containing the object O as a three-dimensional bounding box. Next, the coordinate system setting unit 120 derives an initial reference coordinate system with the center of the cuboid as the origin and each side direction of the cuboid as the xyz axis.

If the object has plane symmetry, the correction unit 160 corrects the axial direction of the initial reference coordinate system so that the initial reference coordinate system has an axis along the inverted plane.

If the object has rotational symmetry with an angular period, the correction unit 160 corrects the axial direction of the initial reference coordinate system based on the peak plane.

Figure 14:
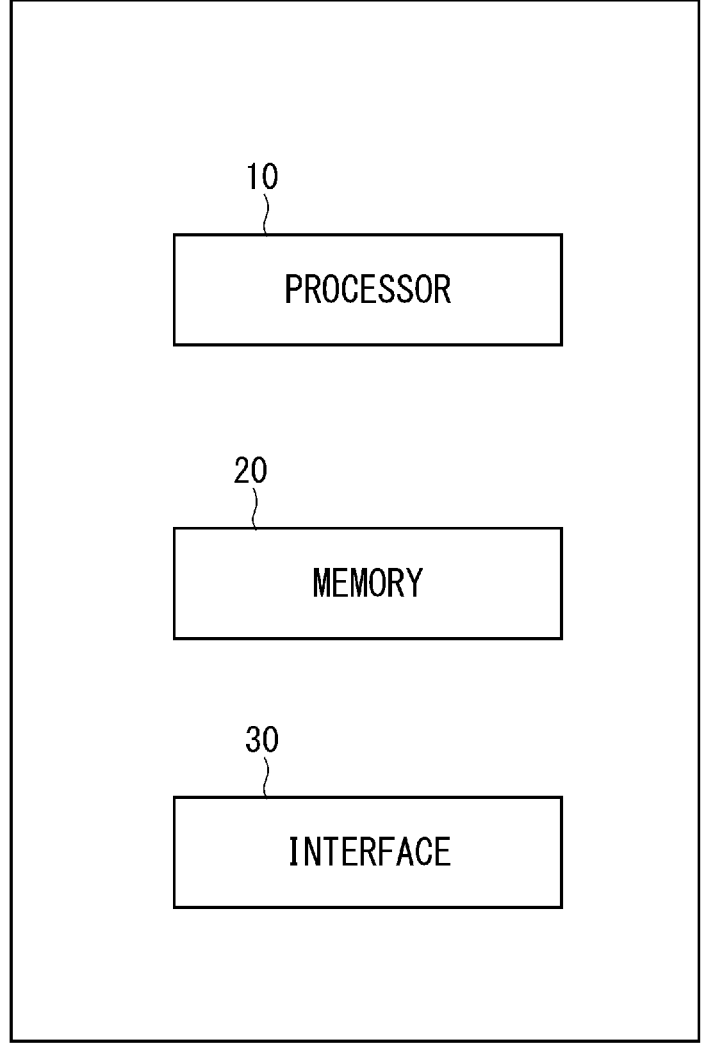
FIG. 14 is a block diagram showing an example of a hardware configuration of a processing apparatus 100.

The above processing methods can be implemented by computer programs and hardware. That is, when the processing apparatus 100 executes predetermined programs, it functions as a generation apparatus or a generation system. FIG. 14 shows an example of a hardware configuration of the processing apparatus 100. The processing apparatus 100 includes a processor 10, a memory 20, an interface 30, and so on. The memory 20 stores programs, various parameters, measurement data, and so on. The processor 10 executes programs stored in the memory 20. The interface 30 transmits data to the three-dimensional shape measuring instrument 200, the end effector 300, the arm mechanism 400, the ranging sensor 500, and the like. The interface 30 also receives data from the three-dimensional shape measuring instrument 200, the end effector 300, the arm mechanism 400, the ranging sensor 500, and the like.

When the processor 10 of the processing apparatus 100 executes the program, the method according to this embodiment can be executed. The processing apparatus 100 may have at least one processor 10. One or more processors 10 then execute the programs stored in the memory to perform the above processing. The processing apparatus 100 is not physically limited to a single apparatus, but may be distributed among a plurality of apparatuses. That is, the above methods may be executed by a plurality of apparatuses performing distributed processing.

Some or all of the above processing may be executed by a computer program. That is, the control of the above processing apparatus 100 is executed when the control computer constituting the processing apparatus 100 executes the program. The above program includes instructions (or software codes) that, when loaded into a computer, cause the computer to perform one or more of the functions described in the embodiment. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Although the disclosure made by the inventor has been described in detail based on the embodiment, the disclosure is not limited to the above embodiment, and it is obvious that various modifications can be made without departing from the scope of the disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A system for generating a three-dimensional model comprising:
   an end effector including a flexible grip part for gripping an object;
   a deformation sensor configured to detect a deformed shape of the grip part in a state of gripping the object; and
   a processor configured to execute a program to:
      calculate a normal direction of at a plurality of points on a surface of the object based on surface shape data of the object,
      set a grip position at which the end effector grips the object based on an amount of deviation in the normal direction among the plurality of points, and
      set a reference coordinate system according to the deformed shape of the grip part.

2. The system for generating a three-dimensional model according to claim 1, further comprising:
   a three-dimensional shape measuring instrument configured to measure a three-dimensional shape of the object by scanning the object,
   wherein the processor is further configured to drive the end effector so that the end effector places the object within a scan range of the three-dimensional shape measuring instrument.

3. The system for generating a three-dimensional model according to claim 2, wherein
   the three-dimensional shape measuring instrument includes a depth sensor configured to measure a distance to the object, and
   a posture of the object with respect to the depth sensor is changed about an axis of the reference coordinate system.

4. The system for generating a three-dimensional model according to claim 3, wherein
   the three-dimensional shape measuring instrument further comprises a table for rotating the placed object, and
   the end effector places the object so that an axis of rotation of the table matches the axis of the reference coordinate system.

5. The system for generating a three-dimensional model according to claim 1, further comprising:
   a surface shape sensor configured to measure surface shape data of the object before the end effector grips the object, wherein
   in the surface shape data, a portion of a cross section closest to a circle is selected as the grip position of the end effector.

6. The system for generating a three-dimensional model according to claim 1, wherein
   symmetry of the object is determined for each axis of the reference coordinate system, and
   the axis of the reference coordinate system is changed according to a result of the determination of the symmetry.

7. The system for generating a three-dimensional model according to claim 1, wherein the processor is further configured to set the reference coordinate system to have a first axis that is at a center position of the end effector and extends in a direction orthogonal to a cross section of the object at the grip position.

8. The system for generating a three-dimensional model according to claim 1, further comprising:

a three-dimensional shape measuring instrument configured to measure a three-dimensional shape of the object by scanning the object, and comprising a table for rotating the placed object, wherein the processor is further configured to drive the end effector to place the object within a scan range of the three-dimensional shape measuring instrument so that an axis of rotation of the table matches the first axis of the reference coordinate system.

9. A method for generating a three-dimensional model comprising:

calculating a normal direction at a plurality of points on a surface of an object according to surface shape data of the object;

setting a grip position at which an end effector grips the object based on an amount of deviation in the normal direction among the plurality of points;

gripping, by an end effector including a flexible grip part, the object at the grip position;

detecting a deformed shape of the grip part when the object is gripped; and setting a reference coordinate system according to the deformed shape of the grip part.

10. The method for generating a three-dimensional model according to claim 9, further comprising:

driving the end effector so that the end effector places the object within a scan range of the three-dimensional shape measuring instrument, wherein a three-dimensional shape of the object is measured by the three-dimensional shape measuring instrument scanning the object.

11. The method for generating a three-dimensional model according to claim 10, wherein the three-dimensional shape measuring instrument includes a depth sensor configured to measure a distance to the object, and a posture of the object with respect to the depth sensor is changed about an axis of the reference coordinate system.

12. The method for generating a three-dimensional model according to claim 11, wherein the three-dimensional shape measuring instrument further comprises a table for rotating the placed object, and the end effector places the object so that an axis of rotation of the table matches the axis of the reference coordinate system.

13. The method for generating a three-dimensional model according to claim 9, further comprising:

measuring, by a surface shape sensor, surface shape data of the object before the end effector grips the object, wherein in the surface shape data, a portion of a cross section closest to a circle is selected as the grip position of the end effector.

14. The method for generating a three-dimensional model according to claim 9, wherein symmetry of the object is determined for each axis of the reference coordinate system, and the axis is changed according to a result of the determination of the symmetry.

15. A non-transitory computer readable medium storing a program for causing at least one computer to execute:

calculating a normal direction at a plurality of points on a surface of an object according to surface shape data of an object;

setting a grip position at which an end effector grips the object based on an amount of deviation in the normal direction among the plurality of points;

controlling an end effector so that the end effector including a flexible grip part grips the object at the grip position;

acquiring deformed shape data obtained by detecting a deformed shape of the grip part when the object is gripped; and setting a reference coordinate system according to the deformed shape of the grip part.

* * * * *